(12) United States Patent
Shelton

(10) Patent No.: US 8,491,009 B2
(45) Date of Patent: Jul. 23, 2013

(54) ANTI-THEFT SYSTEM FOR A CAMPER

(76) Inventor: Mathew Bradley Shelton, Surrey (CA)

( * ) Notice: Subject to any disclaimer, the term of this patent is extended or adjusted under 35 U.S.C. 154(b) by 232 days.

(21) Appl. No.: 13/075,889

(22) Filed: Mar. 30, 2011

(65) Prior Publication Data

US 2012/0247159 A1 Oct. 4, 2012

(51) Int. Cl.
*B60S 9/02* (2006.01)

(52) U.S. Cl.
USPC ........ 280/763.1; 280/475; 280/504; 280/507; 254/45; 254/418

(58) Field of Classification Search
USPC ............ 280/763.1, 507; 254/45, 418, 85, 254/100, 103
See application file for complete search history.

(56) References Cited

U.S. PATENT DOCUMENTS

| | | | |
|---|---|---|---|
| 1,409,456 A * | 3/1922 | Leno | 254/425 |
| 3,580,599 A | 5/1971 | Dodgen | |
| 3,601,271 A | 8/1971 | Margetts | |
| 3,635,366 A | 1/1972 | Dodgen | |
| 3,640,502 A | 2/1972 | Bargman, Jr. | |
| 3,658,376 A | 4/1972 | Dodgen et al. | |
| 3,689,029 A | 9/1972 | Bargman, Jr. | |
| 3,758,074 A | 9/1973 | Jeffries et al. | |
| 3,836,173 A | 9/1974 | Schwaiger | |
| 4,044,999 A | 8/1977 | Dodgen | |
| 4,171,793 A | 10/1979 | Dalsin | |
| 4,905,953 A * | 3/1990 | Wilson | 248/352 |
| 5,067,746 A | 11/1991 | Baker | |
| 5,273,256 A | 12/1993 | Chambers | |
| 5,520,030 A * | 5/1996 | Muldoon | 70/14 |
| 5,553,825 A | 9/1996 | Rasmussen | |
| 5,782,115 A * | 7/1998 | Judy | 70/164 |
| 6,058,749 A | 5/2000 | Rekemeyer | |
| 6,109,078 A * | 8/2000 | Marshall | 70/232 |
| 6,237,377 B1 | 5/2001 | Vasquez, Sr. | |
| 6,283,537 B1 | 9/2001 | Devore, III | |
| 6,607,183 B1 | 8/2003 | White et al. | |
| 6,695,348 B2 * | 2/2004 | Holly | 280/763.1 |
| 7,322,637 B2 | 1/2008 | Smith | |
| 7,416,215 B1 | 8/2008 | Rosario | |
| 7,497,417 B2 | 3/2009 | Perham | |
| 7,584,677 B1 | 9/2009 | Johnson et al. | |
| 2006/0107707 A1 | 5/2006 | Vaughn et al. | |
| 2006/0284146 A1* | 12/2006 | Perham | 254/45 |
| 2009/0200782 A1* | 8/2009 | Albrecht et al. | 280/763.1 |
| 2009/0250904 A1* | 10/2009 | Garton | 280/507 |

FOREIGN PATENT DOCUMENTS

| | | |
|---|---|---|
| EP | 0 105 621 | 4/1984 |
| EP | 0 550 590 | 4/1992 |
| EP | 0 857 589 | 8/1998 |
| WO | WO 00/10820 | 3/2000 |

* cited by examiner

*Primary Examiner* — J. Allen Shriver, II
*Assistant Examiner* — Conan Duda
(74) *Attorney, Agent, or Firm* — Cameron IP

(57) ABSTRACT

The present invention relates to an anti-theft system for a camper. The camper is supported at its front end by a pair of spaced-apart jacks. The system includes a barrier having a first end operatively connecting to a first one of the jacks and a second end opposite thereof. The second end of the barrier operatively connects to a second one of the jacks. The barrier extends in a horizontal direction and is positioned and configured to prevent an unauthorized vehicle from passing underneath the camper and mounting of the camper onto the vehicle.

18 Claims, 16 Drawing Sheets

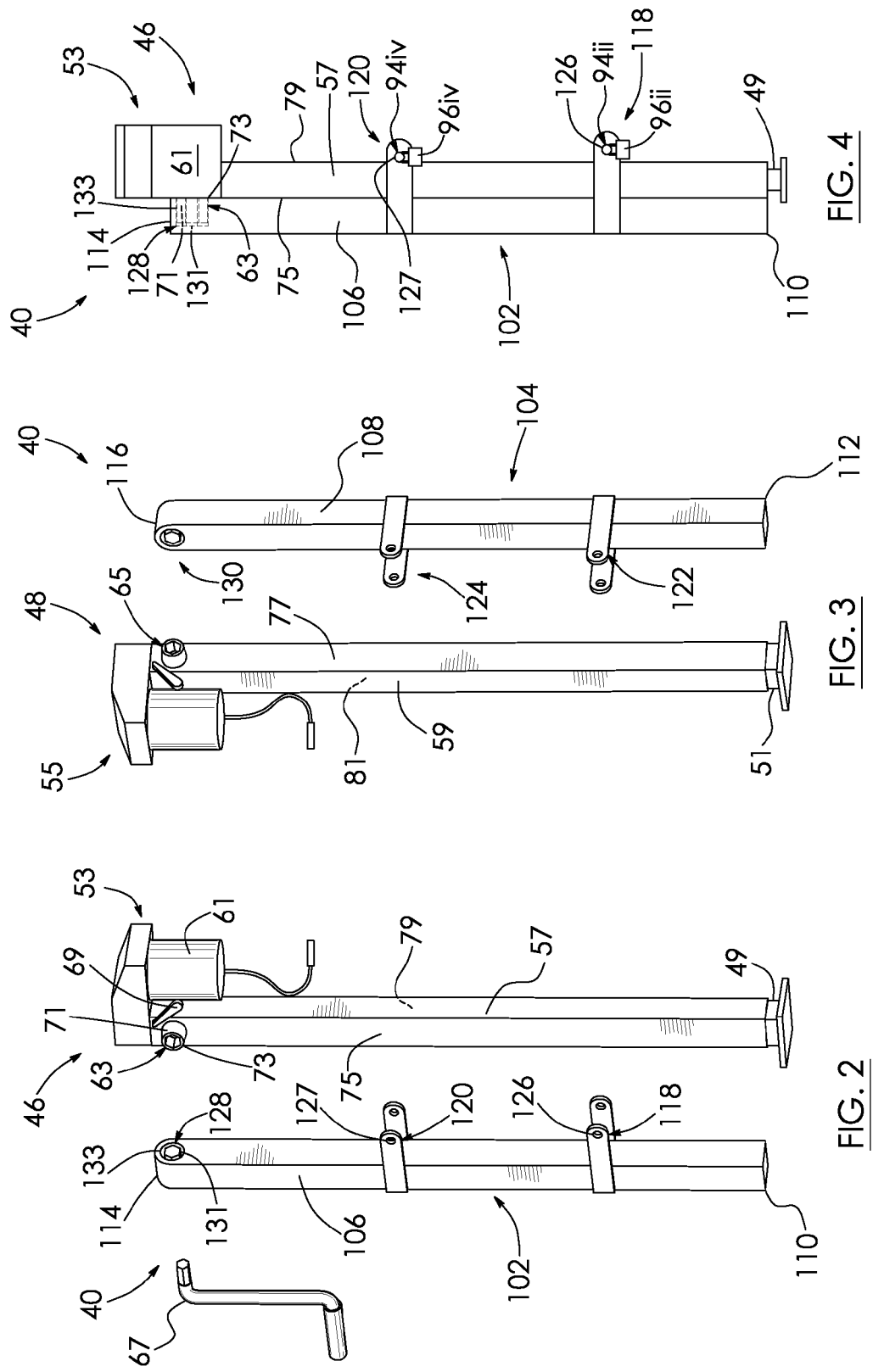

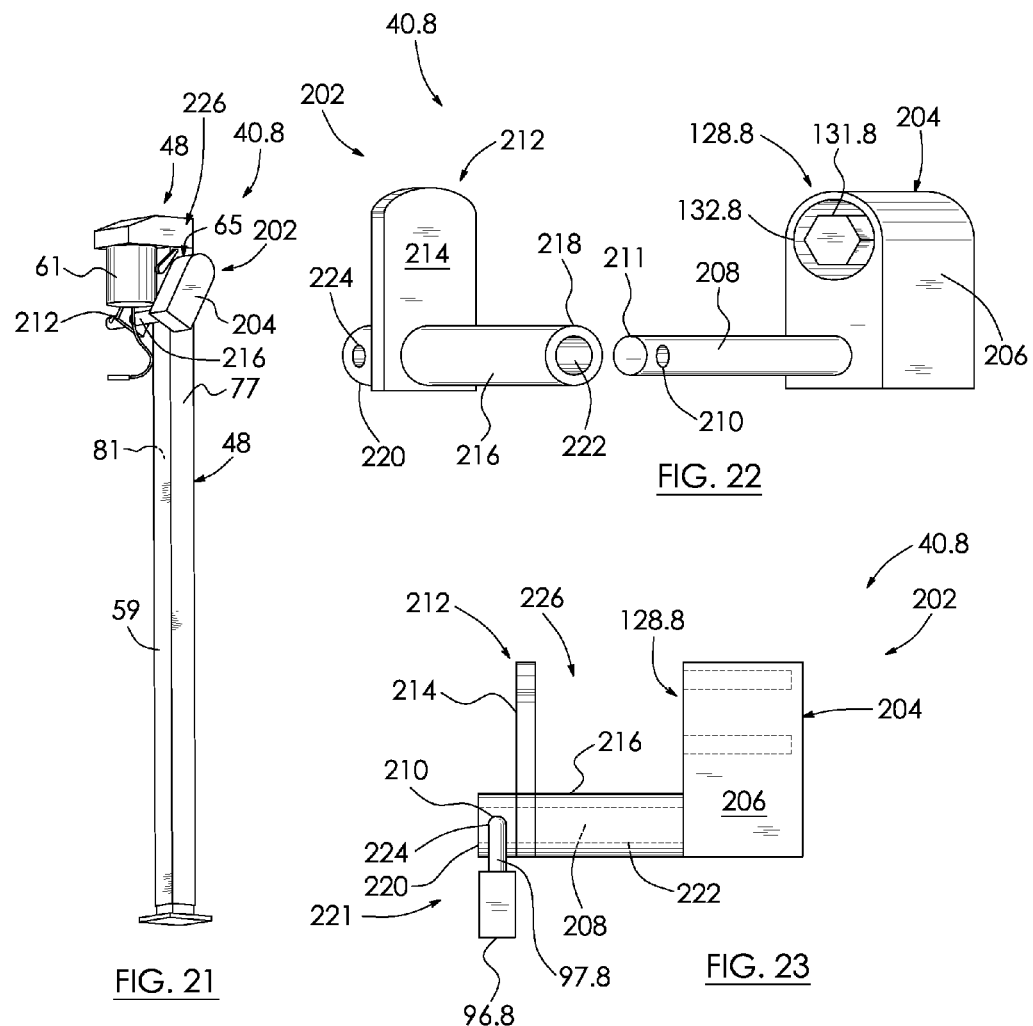

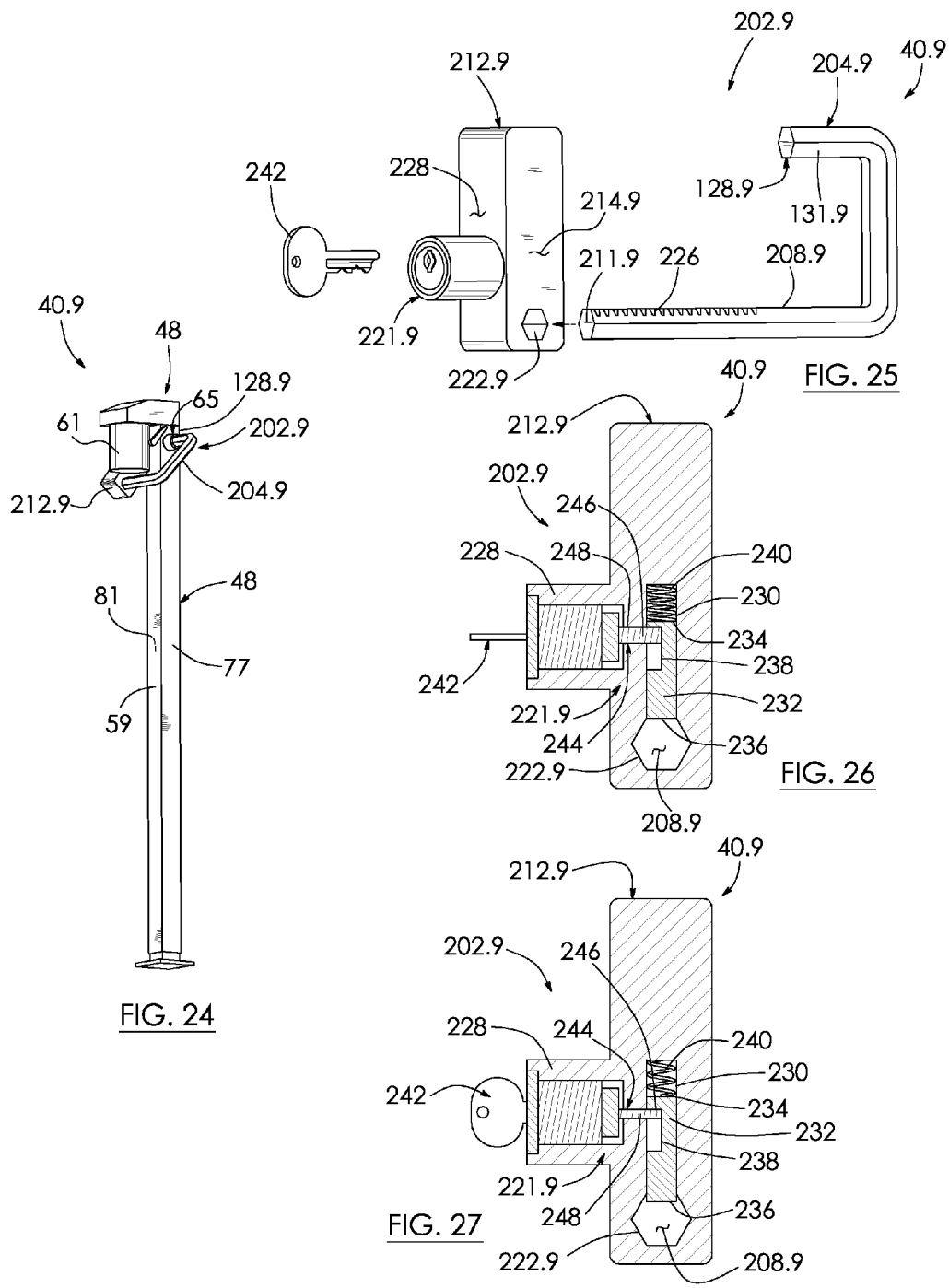

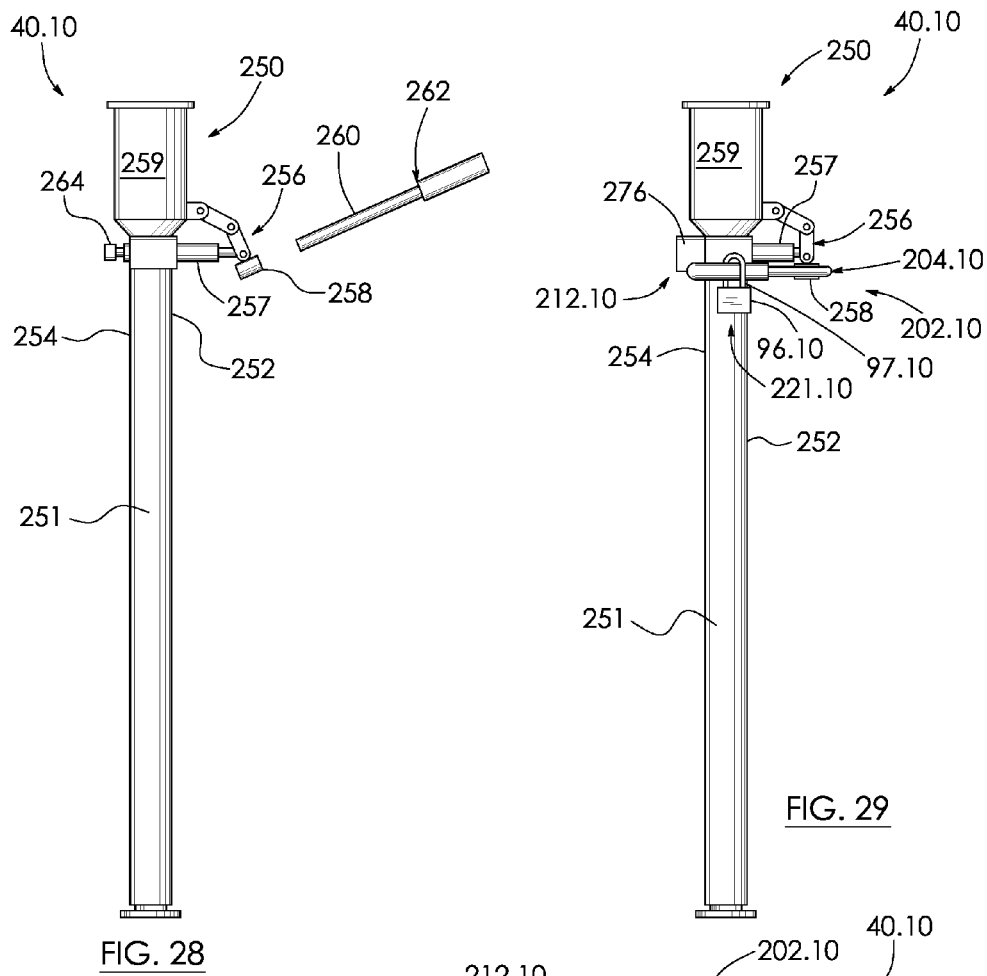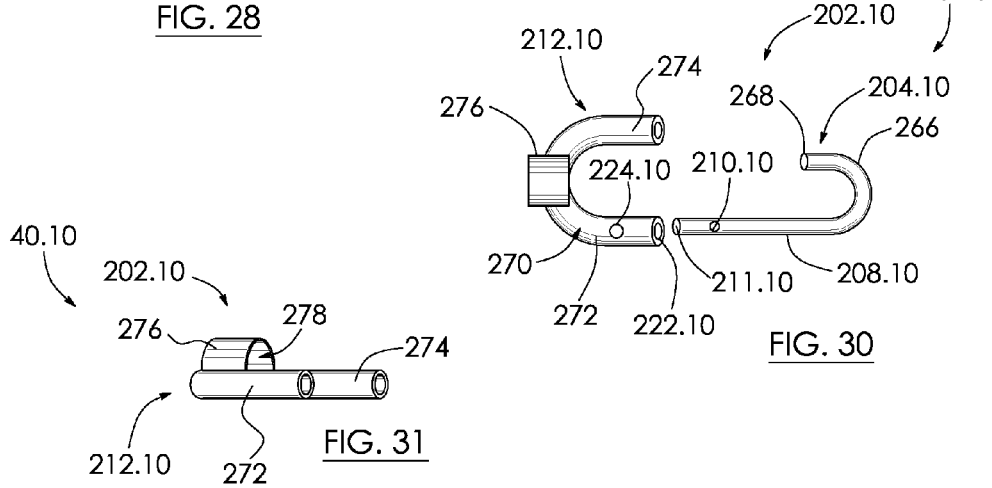

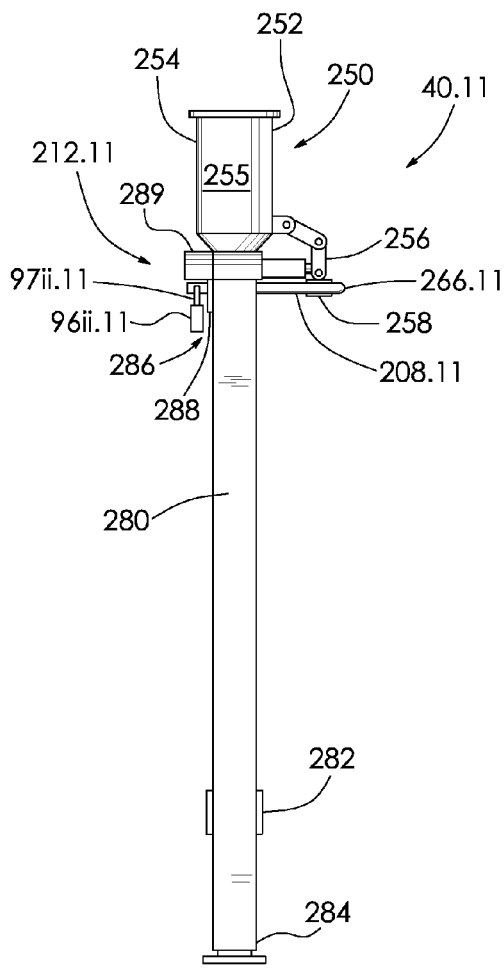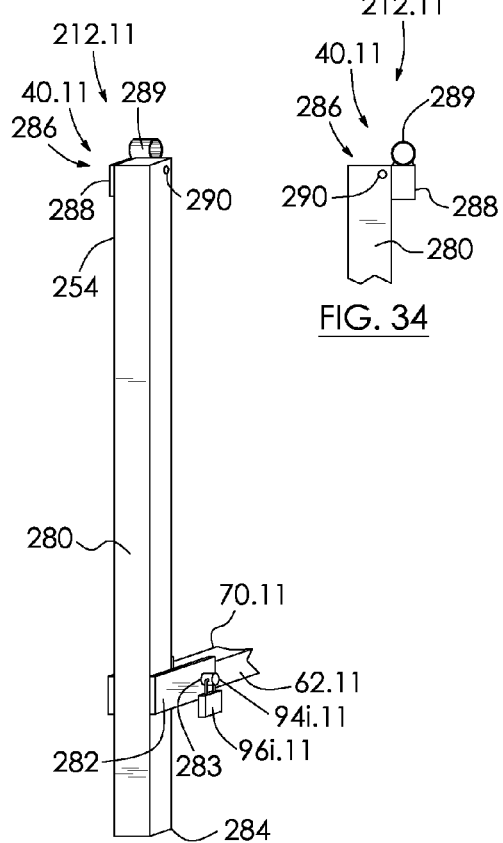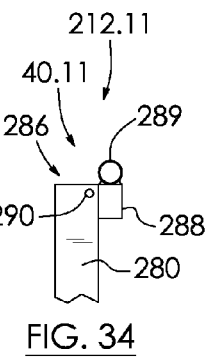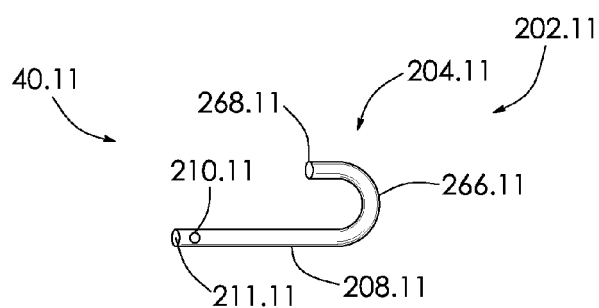
FIG. 32
FIG. 33
FIG. 34
FIG. 35

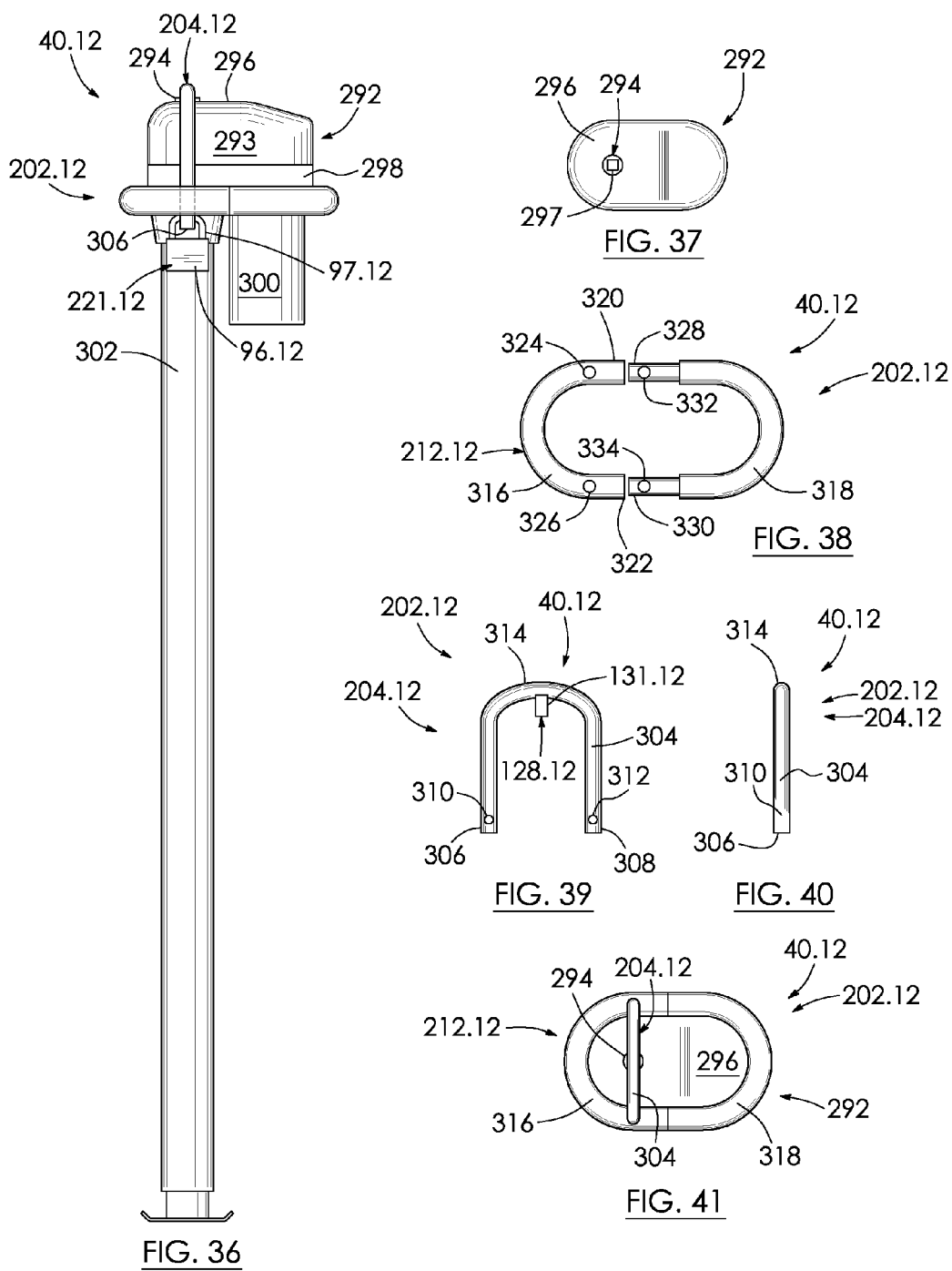

ANTI-THEFT SYSTEM FOR A CAMPER

FIELD OF THE INVENTION

The present invention relates to an anti-theft system. In particular, the invention relates to an anti-theft system for a truck camper.

DESCRIPTION OF THE RELATED ART

Campers are becoming more and more expensive items and thus more vulnerable to theft. This is particularly true given that many people park their campers in their driveways in front of their homes or in public storage yards. Oftentimes valuable goods and very personal items are stored in campers. The loss and damage arising from camper theft may thus be particularly significant and burdensome.

There is accordingly a need to solve this problem in a cost-effective and user-friendly manner.

BRIEF SUMMARY OF INVENTION

The present invention provides an anti-theft system for campers disclosed herein that overcomes the above problem. It is an object of the present invention to provide an improved anti-theft system for campers.

There is accordingly provided an anti-theft system for a camper. The camper is supported at its front end by a pair of spaced-apart jacks. The system includes a barrier having a first end operatively connecting to a first one of the jacks and a second end opposite thereof. The second end of the barrier operatively connects to a second one of the jacks. The barrier extends in a horizontal direction and is positioned and configured to prevent an unauthorized vehicle from passing underneath the camper and mounting of the camper onto the vehicle.

There is also provided a locking device for inhibiting operation of a camper jack. The jack has a pair of spaced-apart sides and a socket member located adjacent to a first one of said sides. The socket member operatively connects to a thread screw mechanism for raising and lowering the jack upon rotation of the socket member. The device includes an engagement member having a mating portion configured to snugly engage the socket member of the jack. The device includes a support member. A first one of the engagement member and the support member has a shaft. A second one of the engagement member and the support member has an aperture configured to receive the shaft. The support member is configured to abut with and at least partially extend along at least one of the sides of the jack when both the mating portion and socket member are engaged and the engagement member and the support member are so connected together. The device includes a locking mechanism configured to selectively retain the shaft of the first one of the engagement member and the support member within the aperture of the second one of the engagement member and the support member. The device inhibits rotation of the socket member and thus inhibits operation of the jack thereby.

There is further provided an anti-theft system for a camper having a hydraulic jack. The jack has a pair of spaced-apart sides and a hydraulic lever adjacent to a first one of said sides for manually operating the jack. The system has a locking device including an engagement member having a lever connector configured to engage the hydraulic lever of the jack. The locking device includes a support member. A first one of the engagement member and the support member has a shaft and a second one of the engagement member and the support member has an aperture configured to receive the shaft. The second member is configured to abut with and at least partially extend along a second one of the sides of the jack when both the lever connector and the hydraulic lever are engaged and the engagement member and the support member are so connected together. The locking device includes a locking mechanism configured to selectively retain the shaft of the first one of the engagement member and the support member within the aperture of the second one of the engagement member and the support member. The device inhibits actuation of the lever and thus inhibits operation of the jack thereby.

BRIEF DESCRIPTION OF DRAWINGS

The invention will be more readily understood from the following description of preferred embodiments thereof given, by way of example only, with reference to the accompanying drawings, in which:

FIG. 2 is a perspective view of one of the mounts shown in FIG. 1, together with one of the jacks shown in FIG. 1 and a removable crank handle;

FIG. 3 is a perspective view of another of the mounts shown in FIG. 1, together with another jack;

FIG. 4 is an elevation front view of the mount shown in FIG. 2 connected and engaged with the jack shown in FIG. 2;

FIG. 21 is a perspective view of one of the camper jacks shown in FIG. 1 and an anti-theft system according to a ninth embodiment, the system including a locking device shown in a locked position;

FIG. 22 is a perspective view of the system shown in FIG. 21, the locking device having an engagement member and a support member;

FIG. 23 is a side elevation view of the system shown in FIG. 21, showing the engagement member and the support member locked together and spaced-apart therefrom;

FIG. 24 is a perspective view of one of the camper jacks shown in FIG. 1 and an anti-theft system according to a tenth embodiment, the system including a locking device shown in a locked position;

FIG. 25 is a perspective view of the system shown in FIG. 24, the locking device having an engagement member and a support member spaced-apart therefrom, the support member having a housing with a lock mechanism;

FIG. 26 is a sectional view of the housing of the support member and part of the engagement member shown in FIG. 25 and showing the lock mechanism of the locking device having a latch and the lock mechanism being in an unlocked position;

FIG. 27 is a sectional view of the housing of the support member and part of the engagement member referred to in FIG. 25, showing the lock mechanism in a locked position with the latch abutting the engagement member;

FIG. 28 is a side elevation view of a hydraulic jack for a camper with a removable handle for the manual operation thereof;

FIG. 29 is a side elevation view of the hydraulic jack shown in FIG. 28 and an anti-theft system for the jack according to an eleventh embodiment, the system having a locking device shown in a locked position, the locking device including an engagement member and a support member;

FIG. 30 is a top perspective view of the system shown in FIG. 29, showing the engagement member and the support member spaced-apart therefrom;

FIG. 31 is a perspective view of part of the system shown in FIG. 29, showing the support member in further detail;

FIG. 32 is an elevation view of the hydraulic jack shown in FIG. 28 and an anti-theft system for the jack according to a twelve embodiment, the system having a locking device and a mount connected therewith;

FIG. 33 is a front, side perspective view of part of the system shown in FIG. 32, showing the mount in further detail and including a cap for covering the release valve of the jack;

FIG. 34 is a front elevation view of the mount shown in FIG. 33, showing a fragment of the top of the mount with the cap connected thereto;

FIG. 35 is a top perspective view of the locking device of the system shown in FIG. 32, showing the locking device in more detail;

FIG. 36 is an elevation view of a camper jack having a socket member located on its top and an anti-theft system for the jack according to a thirteenth embodiment, the system having a locking device shown in a locked position, the locking device having an engagement member and a support member, the engagement member engaging with the socket member;

FIG. 37 is a top plan view of the camper jack shown in FIG. 36;

FIG. 38 is a top plan view of the support member shown in FIG. 36, the support member including a pair of u-shaped tubes that are shown disassembled and spaced-apart from each other;

FIG. 39 is a side elevation view of the engagement member shown in FIG. 36;

FIG. 40 is a front elevation view of the engagement member shown in FIG. 36; and FIG. 41 is a top plan view of the system shown in FIG. 36 as connected in the locked position to the jack shown in FIG. 36.

DESCRIPTION OF THE PREFERRED EMBODIMENTS

Figure 1:
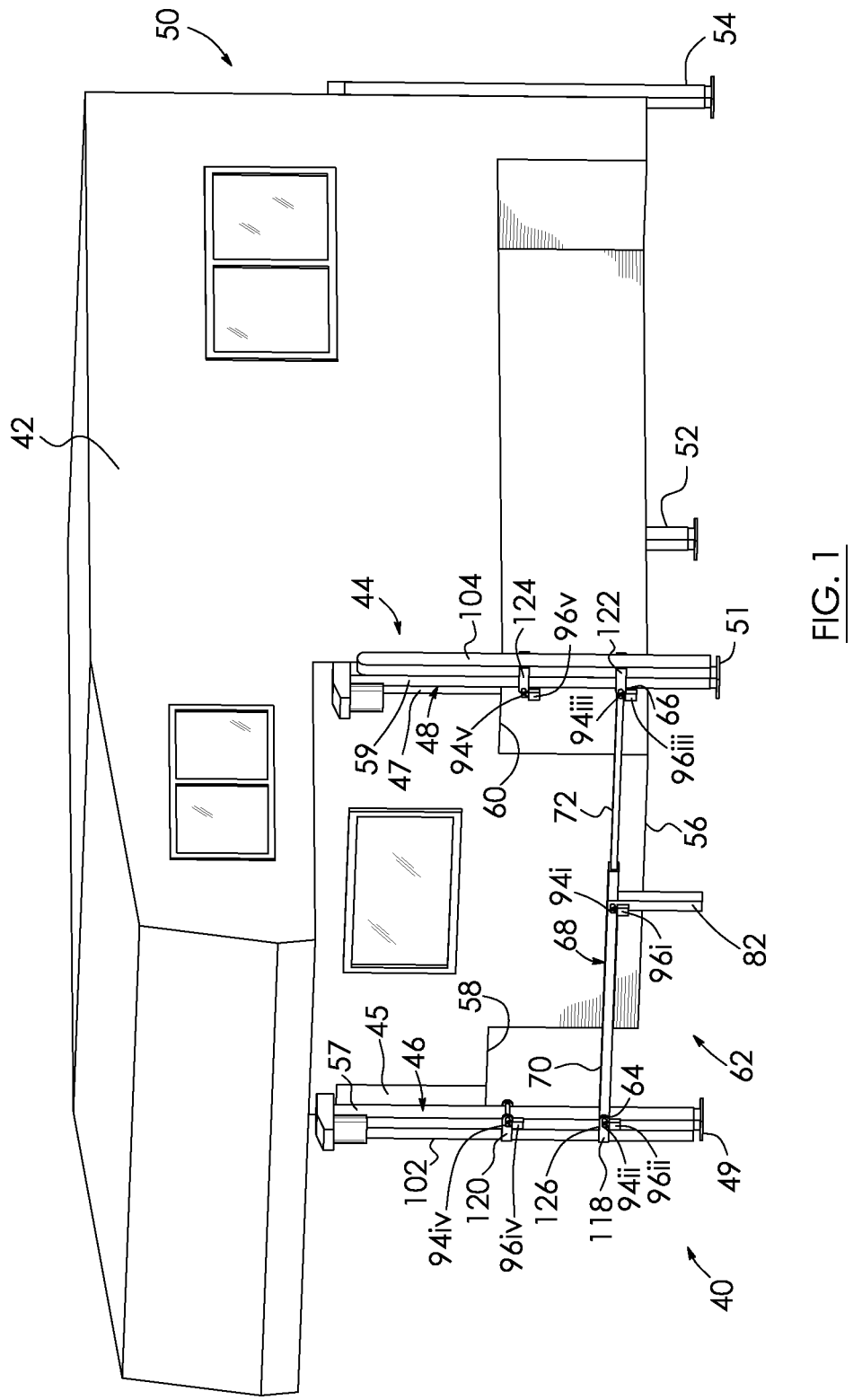
FIG. 1 is a front, side perspective view of a camper supported by a plurality of camper jacks and an anti-theft system for the camper, according to a first embodiment, the system including mounts and a barrier extending between the jacks at the front end of the camper, the jacks having socket members on their sides as shown in FIGS. 2 and 3.

Referring to the drawings and first to FIG. 1, there is shown an anti-theft system 40 for a camper 42 of the type normally mounted on the bed of a pickup truck (not shown). The camper is conventional and will be described first.

The camper 42 is shown removed from a vehicle and is supported at the corners of its front end 44 by a pair of spaced-apart telescopic jacks 46 and 48. The camper 42 is supported at the corners of its back end 50 by telescopic jacks 52 and 54. The jacks are connected to the camper via L-shaped jack mounts as shown by jack mounts 45 and 47 in FIG. 1 for jacks 46 and 48. Referring to FIGS. 2 and 3, jacks 46 and 48 have lower ends 49 and 51 for resting on the ground, upper ends 53 and 55 opposite thereof and leg members 57 and 59 extending between the ends. The jacks also have outer sides 75 and 77 and inner sides 79 and 81 opposite thereof.

The jacks may be operated by motors which extend or retract the jacks, as shown in FIG. 2 by motor 61, for jack 46, or also may be operated manually. Jacks 46 and 48 include socket members 63 and 65 adjacent to the upper ends 53 and 55. The socket members extend outwards from outer sides 75 and 77 of the jacks. The socket members operatively connect to a thread screw mechanism and rotation of the socket members thus causes the jacks to raise or lower. This mechanism is conventional and therefore is not shown in detail. The socket members as shown by socket members 63 are in the form of frustoconical protrusions 71 having inwardly extending hexagonal sockets 73. However, in other examples, the socket members may be in the form of projections having hexagonal-shaped exterior cross-sections. The camper jacks include a removable crank handle 67 as shown in FIG. 2 configured to engage the socket members 63 for manually elevating or lowering the jacks. Camper jack handles are typically removed and stored after use. The jacks also include release levers as shown by lever 69 in FIG. 2. Levers 69 disengage the jacks' electric motors so that the jacks can be raised or lowered manually. Camper jacks are well known to those skilled in the art and therefore will not be described in further detail.

Referring back to FIG. 1, camper 42 has a bottom 56 and a pair of recessed portions 58 and 60 for receiving the bed and sides of a pickup truck, respectively. The jacks shown in FIG. 1 are configured to enable a truck to be driven underneath bottom 56 and through recessed portions 58 and 60. The jacks may then be lowered to mount the camper onto the truck.

Figure 5:
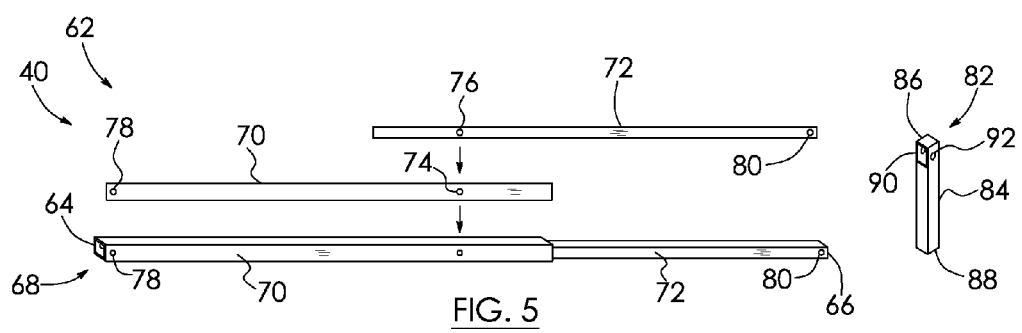
FIG. 5 is a disassembled perspective view of the parts of the barrier for the system shown in FIG. 1.

The system 40 includes a barrier 62 configured to operatively connect to and extend across jacks 46 and 48, in this example in a horizontal direction. The barrier 62 is configured to prevent an unauthorized vehicle from passing underneath the camper and mounting of the camper on the vehicle. The barrier 62 in this embodiment is length-adjustable and telescoping. The barrier has a first end 64 and a second end 66 opposite thereof. Barrier 62 includes a horizontal portion 68 extending between the jacks 46 and 48. As shown in FIG. 5, the horizontal portion in this example includes a hollow first bar 70 and a second bar 72 partially receivable telescopically within the first bar. The bars 70 and 72 are square tubes in this example and include inner apertures 74 and 76 and outer apertures 78 and 80 spaced-apart therefrom. Outer aperture 78 is disposed adjacent to end 64 of the barrier and outer aperture 80 is disposed adjacent to end 66 of the barrier. Inner apertures 74 and 76 of the bars 70 and 72 are alignable with each other.

Referring back to FIG. 1, barrier 62 includes a vertical portion 82 disposable between the first end 64 and the second end 66 of the barrier. As shown in FIG. 5, vertical portion 82 is, in this example, a bar 84 in the form of a square tube. Bar 84 has a first end 86 and a second end 88 opposite thereof. The bar at end 86 includes an opening 90 shaped to enable bars 70 and 72 to pass therethrough as shown in FIG. 1. Bar 84 also includes an aperture 92 adjacent to end 86 and disposed transverse to opening 90. Aperture 92 is alignable with apertures 74 and 76 of the bars 70 and 72. As shown in FIG. 1, the vertical portion 82 of the barrier extends downwards relative to the horizontal portion 68 and downwards below the bottom 56 of the camper 42. The vertical portion is thus configured to further prevent an unauthorized vehicle from passing underneath the camper. The barrier 62 may be said to represent a first layer of protection for preventing theft of the camper.

Figures 6, 7, 8:
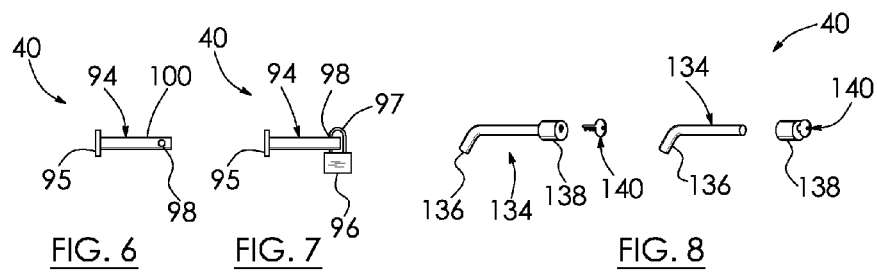
FIG. 6 is a top plan view of a pin for the system shown in FIG. 1.
FIG. 7 is a side elevation view of the pin shown in FIG. 6, together with a lock therefor.
FIG. 8 is a perspective view of lockable pin according to another embodiment for the system shown in FIGS. 1 to 5.

The system 40 includes a means shown in FIGS. 6 and 7 for lockably securing the system in place, including fixedly connecting the bars together. In this example the means for lockably securing the system in place is in the form of a plurality of pins and locks as shown by pin 94 and lock 96. Pin 94 includes a head 95 at its first end, an aperture 98 at its second end, and a shaft 100 extending between its ends. Shafts 100 are configured to pass through the apertures 74, 76, 78, 80, 92 shown in FIG. 5. Lock 96 has a shackle 97 and is a conventional padlock, well known to those skilled in the art, and therefore will not be described in detail. Referring to FIG. 5, bars 70, 72 and 84 are positioned such that apertures 74, 76 and 92 align with each other. Pin 94$i$ is disposed through each of the apertures until head 95 abuts bar 84 and aperture 98 of the pin extends past the other side of bar 84. The shackle of lock 96$i$ then passes through aperture 98 of the pin for locking the pin in place and connecting bars 70, 72, and 84 together thereby as shown in FIG. 1.

Referring to FIGS. 2 to 4, the system 40 includes a pair of mounts 102 and 104 for mounting the barrier 62 shown in FIG. 1 in the horizontal direction. The mounts in this embodiment are in the form of square bars 106 and 108 with first ends 110 and 112 disposed adjacent to ends 49 and 51 of the jacks as seen in FIG. 1. The mounts also include second ends 114 and 116 opposite the first ends 110 and 112. Ends 114 and 116 are disposed adjacent to socket members 63 and 65 of the jacks.

The mounts 102 and 104 are configured to substantially extend along and in parallel with the jacks in a vertical direction as seen in FIG. 1. Mounts 102 and 104 include pairs of spaced-apart brackets 118 and 120 and 122 and 124, respectively, each disposed between the ends of the mounts. As shown in FIG. 1, brackets 118 and 120 are disposed between lower ends 49 and 51 of the jacks and recessed portions 58 and 60 of the camper 42. Referring back to FIGS. 2 to 4, the brackets each include apertures as shown by aperture 126 for bracket 118 in FIG. 2 and aperture 127 for bracket 120. The brackets are configured to receive and partially extend past leg members 57 and 59 of the jacks, as seen in FIG. 1. The mounts align with the leg members such that the brackets are positioned to receive the jacks. This is shown in FIG. 4 with brackets 118 and 120 of mount 102 receiving leg member 57 of jack 46.

Pins 94$ii$, 94$iii$, 94$iv$, 94$v$ and locks 96$ii$, 96$iii$, 96$iv$, and 96$v$ pass through the apertures of the brackets 118, 122, 120 and 124 for lockably securing the mounts 102 and 104 to the jacks 46 and 48 thereby. This is shown in FIG. 4 with pins 94$ii$ and 94$iii$ passing through brackets 118 and 120 of mount 102, with the pins then being locked in place by locks 96$ii$ and 96$iv$.

The apertures of the upper brackets 120 and 124, as shown by aperture 127 for bracket 120, are slightly inset so as to align adjacent to the leg members of the jacks. Put another way and as shown with reference to FIG. 4, aperture 127 of bracket 120 is positioned such that the pin 94$iv$, passing through the bracket 120, snugly abuts against the leg member 57. Pin 94$iv$ so positioned thus acts to hold the mount 102 in place snugly against the leg member and prevents the mount from being pulled away from the jack 46 to any significant extent. Referring to FIG. 1, the same configuration applies for the aperture of bracket 124 for mount 104 and its pin 94$v$.

Referring to FIGS. 1 to 5, barrier 68 is selectively connected to the mounts 102 and 104 via brackets 118 and 122, in this example. Pin 94$ii$ passes through apertures 126 and 78 and lock 96$ii$ locks the first bar 70 in place. Likewise, second bar 72 connects to bracket 122 by aligning end 66 and aperture 80 with the corresponding aperture of bracket 122 and then lockably inserting pin 94$iii$ therethrough. Thus, the means for lockably securing the system in place, shown in FIGS. 6 and 7, includes fixedly connecting the bars to the mounts.

Mounts 102 and 104 have mating portions 128 and 130 disposed adjacent to the second ends 114 and 116 of the mounts as shown in FIGS. 2 and 3. Mating portions 128 and 130 are configured to snugly fit within and engage exposed socket members 63 and 65 of the jacks. This is shown in FIG. 4 with mating portion 128 of mount 102 engaging socket member 63 of jack 46. The mating portions are configured to inhibit rotation of the socket members 63 and 65 and thus inhibit operation of the jacks. In this example and referring to FIG. 2, each mating portion 128 is in the form of a protrusion 131 having a hexagonal shape. Protrusion 131 is disposed within a generally cylindrical-shaped aperture 133 configured to receive frustoconical protrusions 71 of the socket members 63. Protrusion 131 is configured to snugly fit within hexagonal socket 73 as shown in FIG. 4. The system 40 with its mating portions thus acts to further secure the camper, with the mating portions functioning as a second layer of protection. Mating portions 128 and 130 effectively render the jacks inoperable and thus inhibit the lowering of the camper 42 onto to a truck or other vehicle.

Pins 94$iv$ and 94$v$ ensure that mating portions 128 and 130 are held in place within socket members 63 and 65. These pins are thus configured to prevent the mounts 102 and 104 from being pulled away from the jacks to a degree that would cause the mating portions and socket members to disengage.

In the alternative, the mating portions may extend outwards from the bars 106 and 108. For example, if jack 46 had an inwardly-set socket member similar to mating portion 128, mount 102 in another embodiment would have an outwardly-extending mating portion configured similar to socket member 63.

The system may provide yet further layers of protection by connecting yet further mounts, similar to mounts 102 and 104 shown in FIGS. 2 to 4, to the jacks 52 and 54 shown in FIG. 1 located at the back end 50 of the camper 42.

FIG. 8 shows an alternative means for lockably securing the anti-theft system in place in the form of an off-the-shelf lockable pin 134. Pin 134 has a bent portion 136 at its first end and has a head 138 at its second end. The head is removable via a key and lock mechanism 140. Lockable pins 134 are well known to those skilled in the art and therefore their parts and function will not be described further.

Figure 9:
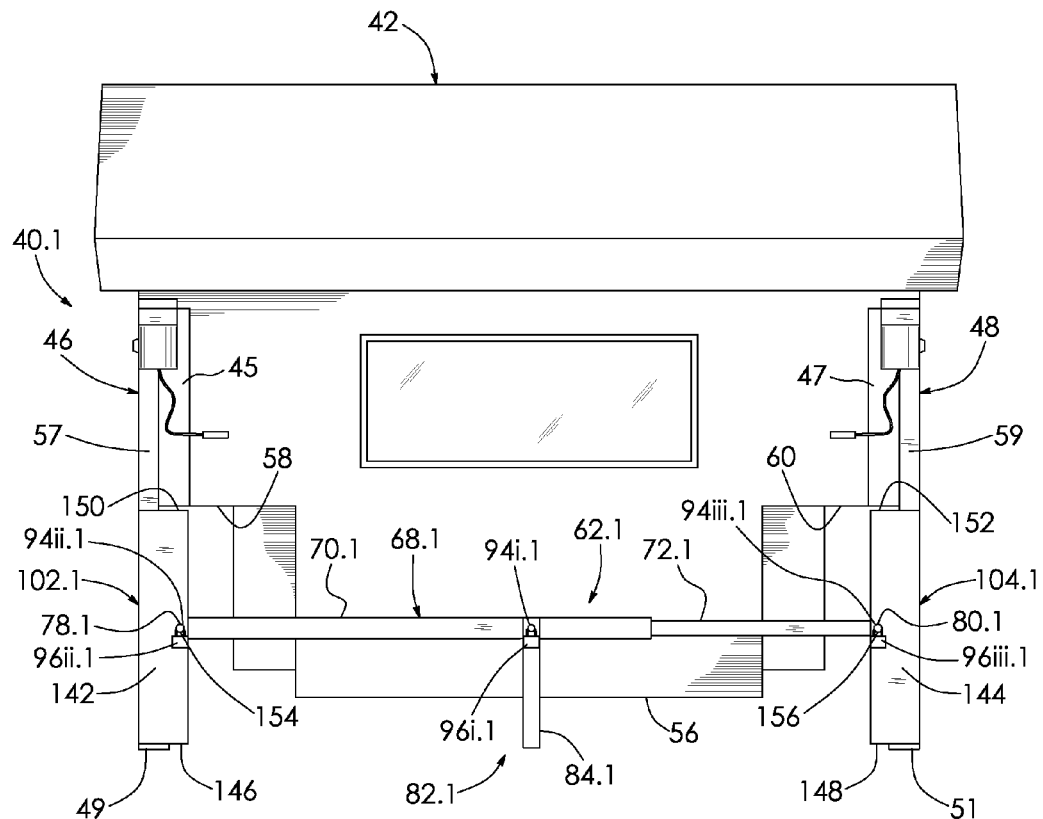
FIG. 9 is a front elevation view of the camper shown in FIG. 1 together with an anti-theft system for the camper according to a second embodiment, the system including a pair of elongated, u-shaped brackets.
Figure 10:
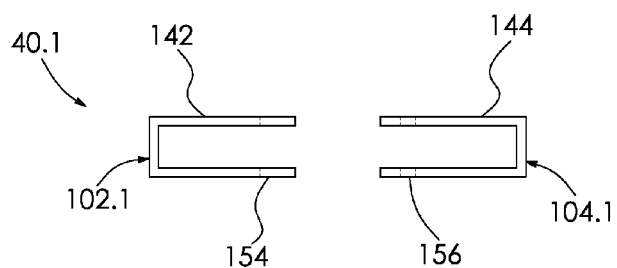
FIG. 10 is a top plan view of the brackets shown in FIG. 9.

FIGS. 9 and 10 show an anti-theft system 40.1 for the camper 42 according to a second embodiment. Like parts of the system 40.1 have like numbers and function as system 40 shown in FIGS. 1 to 7 with the addition of "0.1". System 40.1 is similar to system 40 shown in FIGS. 1 to 7 with the following exceptions. Mounts 102.1 and 104.1 are in the form of continuous, elongated u-shaped brackets 142 and 144. The brackets are configured to receive and abut with respective ones of the jacks 46 and 48 when the system 40.1 is lockably secured in place. As shown in FIG. 10, bracket 142 and 144 are channel-shaped which are inwardly facing and configured to face each other in this example.

Referring back to FIG. 9, brackets 142 and 144 have lower ends 146 and 148 located adjacent to lower ends 49 and 51 of the jacks. The brackets also include upper ends 150 and 152 opposite lower ends 146 and 148. The brackets are configured to extend between lower ends 49 and 51 of the jacks and recessed portions 58 and 60 of the camper. The brackets are also configured to extend inwards past leg members 57 and 59 of the jacks. Brackets 142 and 144 have centrally disposed apertures 154 and 156 which are alignable with the outer apertures 78.1 and 80.1 of the bars 70.1 and 72.1. Apertures 154 and 156 are configured to enable pins 94$ii$.1 and 94$iii$.1 to pass through. Barrier 62.1 is lockably held in place via said pins 94$ii$.1 and 94$iii$.1 and locks 96$ii$.1 and 96$iii$.1 in a like manner as described previously. Brackets 142 and 144 so shaped are configured to abut recessed portions 58 and 60 of the camper, and in this example jack mounts 45 and 47, when bracket 142 and 144 and/or barrier 62.1 are lifted upwards from the perspective of FIG. 9. Brackets 142 and 144 thus inhibit upward movement of the barrier and thus act to maintain barrier 62.1 in its blocking position.

Figure 11:
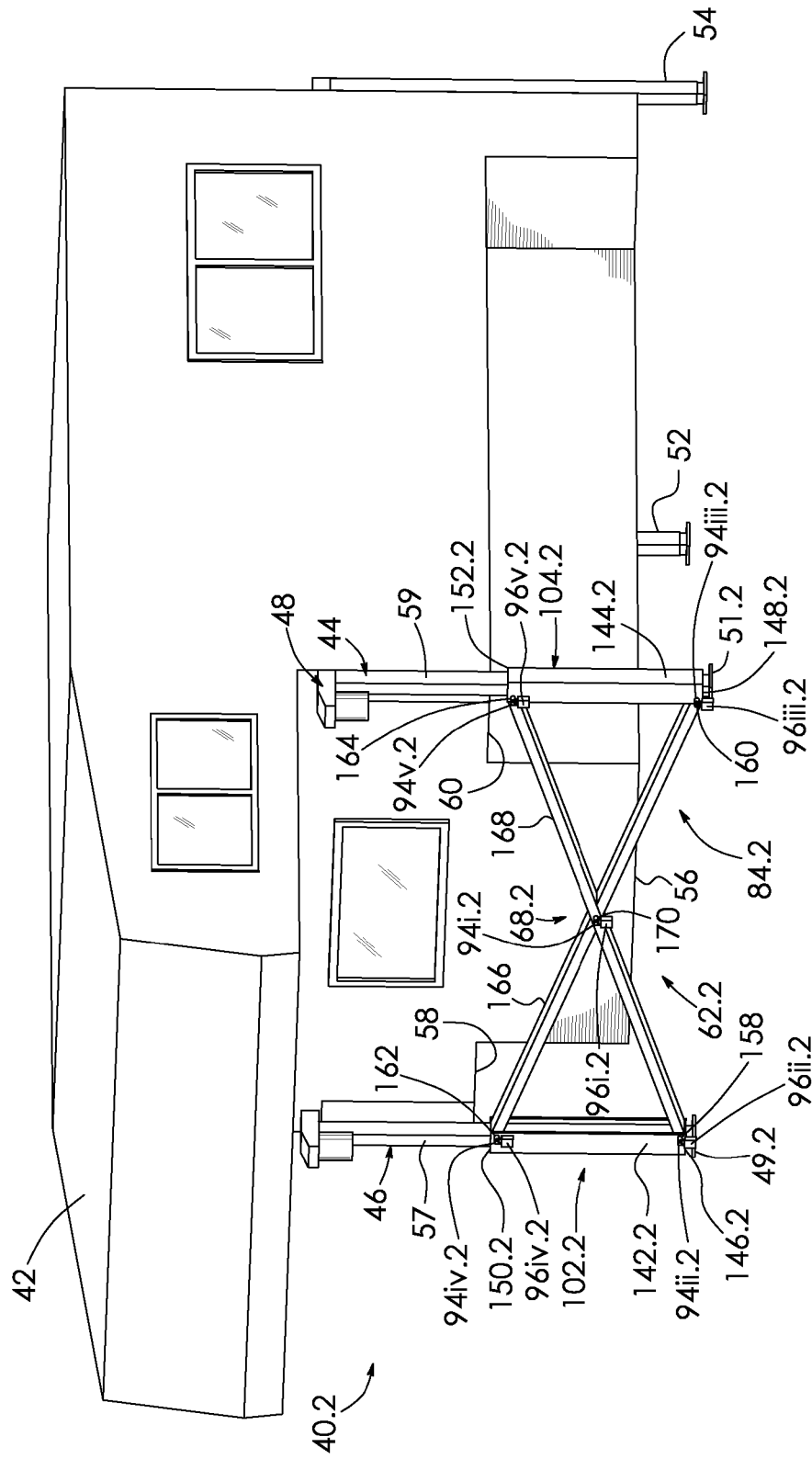
FIG. 11 is a front, side perspective view of the camper shown in FIG. 1 together an anti-theft system for the camper according to a third embodiment, the system including a barrier in the form of bars arranged in a cross-shaped arrangement.

FIG. 11 shows an anti-theft system 40.2 for the camper 42 according to a third embodiment. Like parts of the system 40.2 have like numbers and function as those described for system 40.1 shown in FIGS. 9 and 10 with numeral endings "0.2" replacing "0.1" and "0.2" being added for like parts previously not having any previous decimal extensions. System 40.2 is substantially the same as system 40.1 shown in FIGS. 9 and 10 with one exception being that the brackets 142.2 and 144.2 have lower apertures 158 and 160 adjacent to their lower ends 146.2 and 148.2 and upper apertures 162 and 164 adjacent to their upper ends 150.2 and 152.2.

System 40.2 is further different in that barrier 62.2 includes a first bar 166 and a second bar 168 which are disposed in a cross-shaped manner. The bars have outer apertures similar to those described with reference to FIG. 5 and connect via pins and locks in a like manner as described previously via apertures 158, 160, 162 and 164 of the brackets. Bar 166 connects to lower end 148.2 of bracket 144.2 and connects to upper end 150.2 of bracket 142.2. Bar 168 connects to the lower end 146.2 of bracket 142.2 and connects to upper end 152.2 of bracket 144.2.

The bars in this example have central apertures 170 through which pin 94$i$.2 may pass through and be locked in place with lock 96$i$.2. Pin 94$i$.2 allows bars 166 and 168 to pivotally connect and align in parallel for storage purposes when the system 40.2 is removed from the camper 42.

Figure 12:
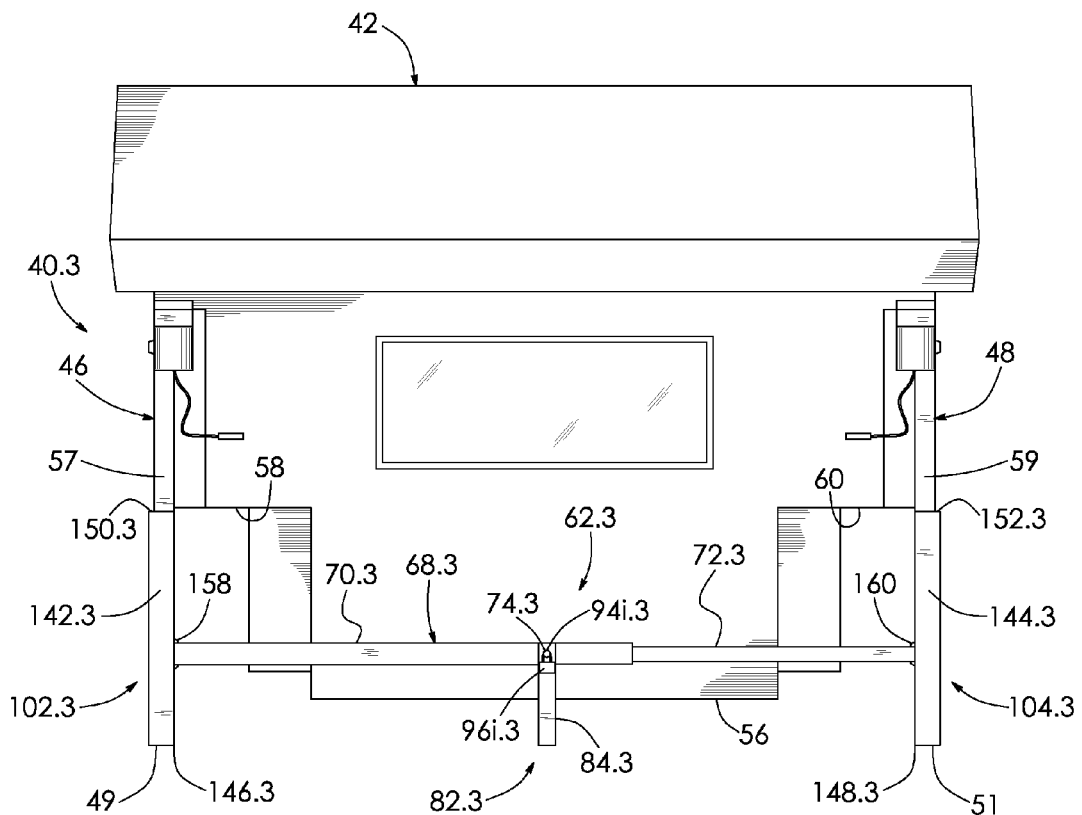
FIG. 12 is a front elevation view of the camper shown in FIG. 1 together with an anti-theft system for the camper according to a fourth embodiment, the system including u-shaped brackets and a barrier extending therebetween.
Figure 13:
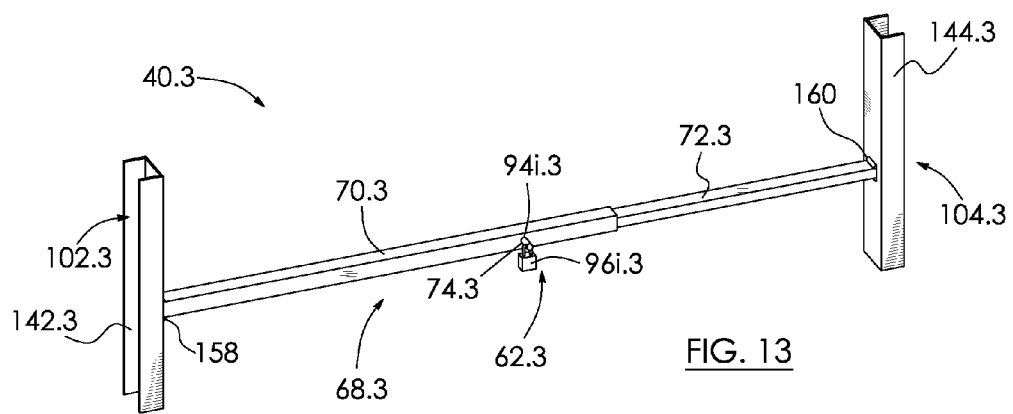
FIG. 13 is a perspective view of the brackets and part of the barrier of the system shown in FIG. 12.

FIGS. 12 and 13 show an anti-theft system 40.3 for a camper 42 according to a fourth embodiment. Like parts of the system 40.3 have like numbers and function as system 40.1 shown in FIGS. 9 and 10, with "0.3" replacing "0.1" and "0.3" being added to parts previously not having any decimal extensions. System 40.3 is substantially similar to system 40.1 shown in FIGS. 9 and 10 with one exception being that the u-shaped brackets 142.3 and 144.3 have outwardly facing channels relative to barrier 62.3, as best shown in FIG. 13. The brackets are configured to receive and abut with respective ones of the jacks when the system is lockably secured in place via apertures 74.3 and pin 94$i$.3 and lock 96$i$.3 as described earlier.

Also, bars 70.3 and 72.3 are fixedly connected to brackets 142.3 and 144.3, respectively, in this example via welds 158 and 160. Thus, advantageously, system 40.3 requires only one lock 96$i$.3 and pin 94$i$.3 connection via apertures 74.3 to be secured in place. While the barrier 62.3 shown in FIG. 12 includes vertical portion 82.3, the barrier may in the alternative just include the horizontal portion 68.3 shown in FIG. 13.

Figure 14:
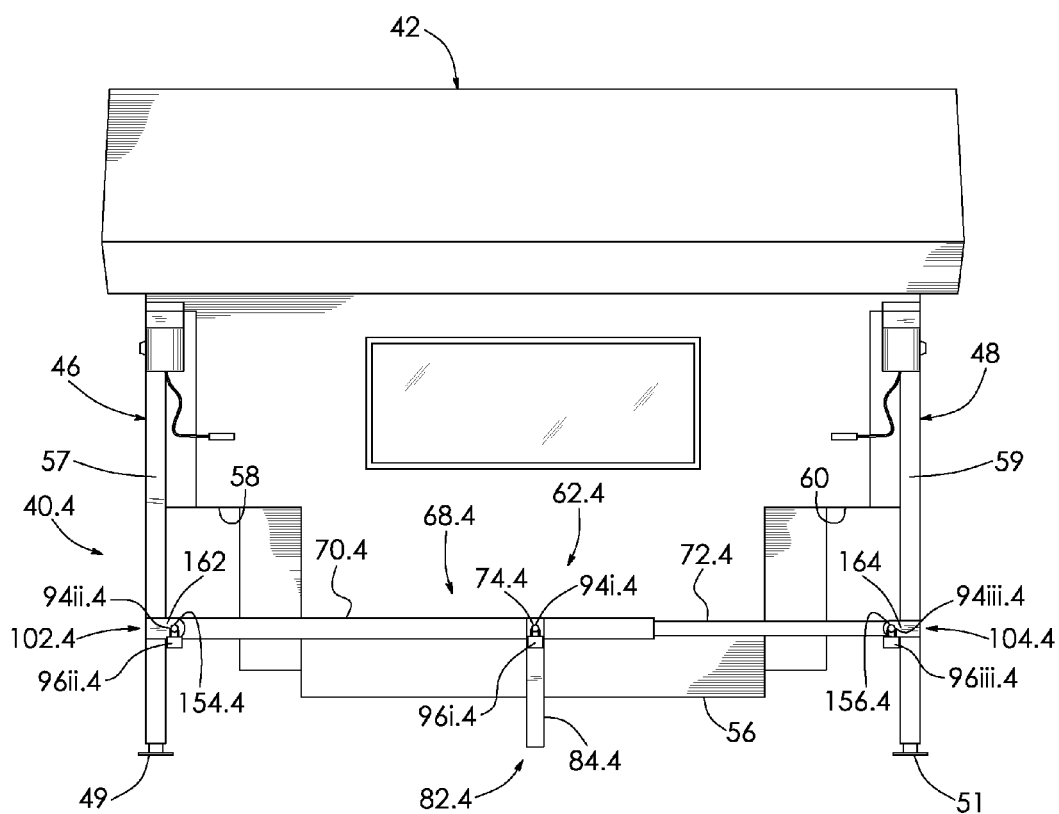
FIG. 14 is a front elevation view of the camper shown in FIG. 1 together with an anti-theft system for the camper according to a fifth embodiment, the system including mounts that are fixedly connected to the jacks of the camper and a telescoping barrier connecting to and extending between the mounts.

FIG. 14 shows an anti-theft system 40.4 for the camper 42 according to a fifth embodiment. Like parts of system 40.4 have like numbers and function as those of system 40.1 shown in FIGS. 9 and 10 with "0.4" replacing "0.1" and "0.4" being added to parts previously not having any decimal extensions. System 40.4 is substantially similar to system 40.1 shown in FIGS. 9 and 10 with the exception that mounts 102.4 and 104.4 are in the form of single, compact brackets 162 and 164 fixedly connected to the jacks 46 and 48 via, for example, welding or forming. The brackets may thus be preassembled features of the jacks. Brackets 162 and 164 have apertures 154.4 and 156.4 and connect to barrier 62.4 via pins 94$ii$.4 and 94$iii$.4 and locks 96$ii$.4 and 96$iii$.4 in a like manner as described previously.

Figure 15:
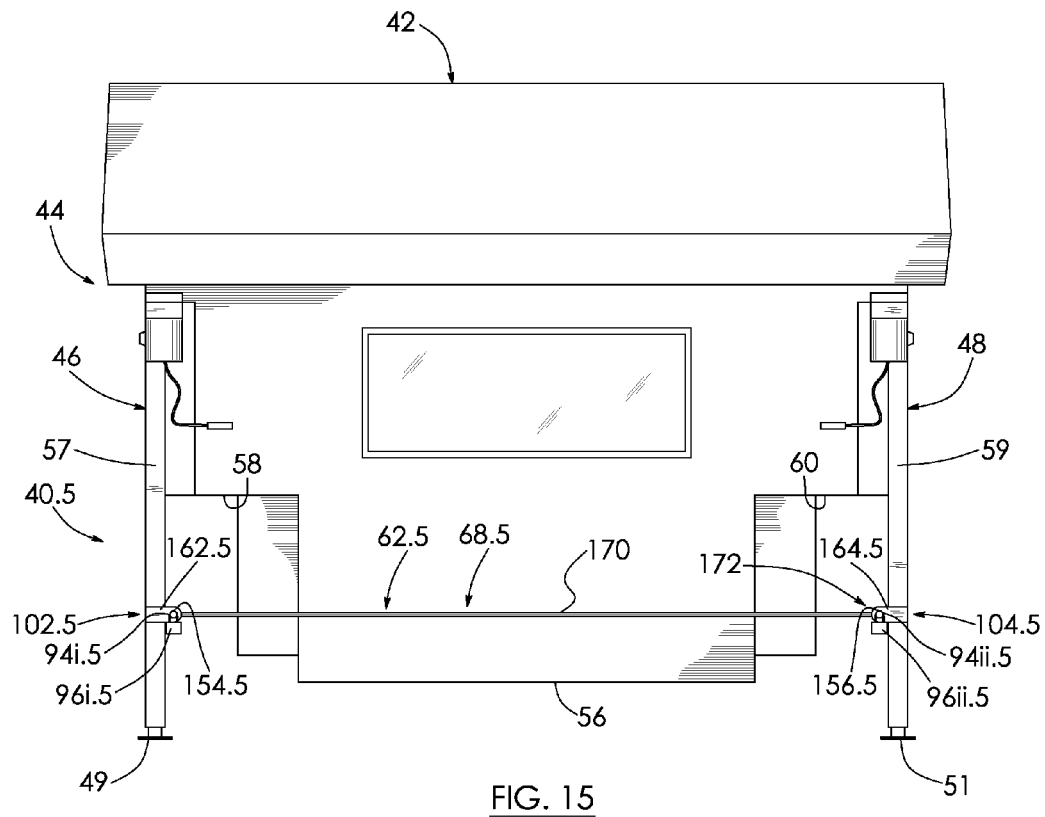
FIG. 15 is a front elevation view of the camper shown in FIG. 1 together with an anti-theft system for the camper according to a sixth embodiment, the system including mounts that are fixedly connected to the jacks of the camper and a cable connecting to and extending between the mounts.
Figure 16:
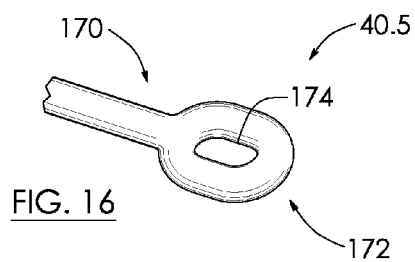
FIG. 16 is a fragmentary, perspective view of a loop-end of the cable shown in FIG. 15.

FIGS. 15 and 16 show an anti-theft system 40.5 for the camper 42 according to a sixth embodiment. Like parts of system 40.5 have like numbers and function as those of system 40.4 shown in FIG. 14 with "0.5" replacing "0.4" and "0.5" being added to parts previously not having any decimal extensions. System 40.5 is similar to system 40.4 shown in FIG. 14 with the exception that barrier 62.5 is a flexible member in this example cable 170. The cable has looped ends as shown by end 172 shown in FIG. 16. Apertures 174 are formed by the looped ends. The cable 170 connects via its looped ends 172 to the mounts 102.5 and 104.5 with pins 94$i$.5 and 94$ii$.5 and locks 96$i$.5 and 96$ii$.5 in a like manner as described earlier.

While cable 170 is shown in FIGS. 15 and 16, in the alternative, the flexible member may comprise a chain or other flexible material.

Figure 17:
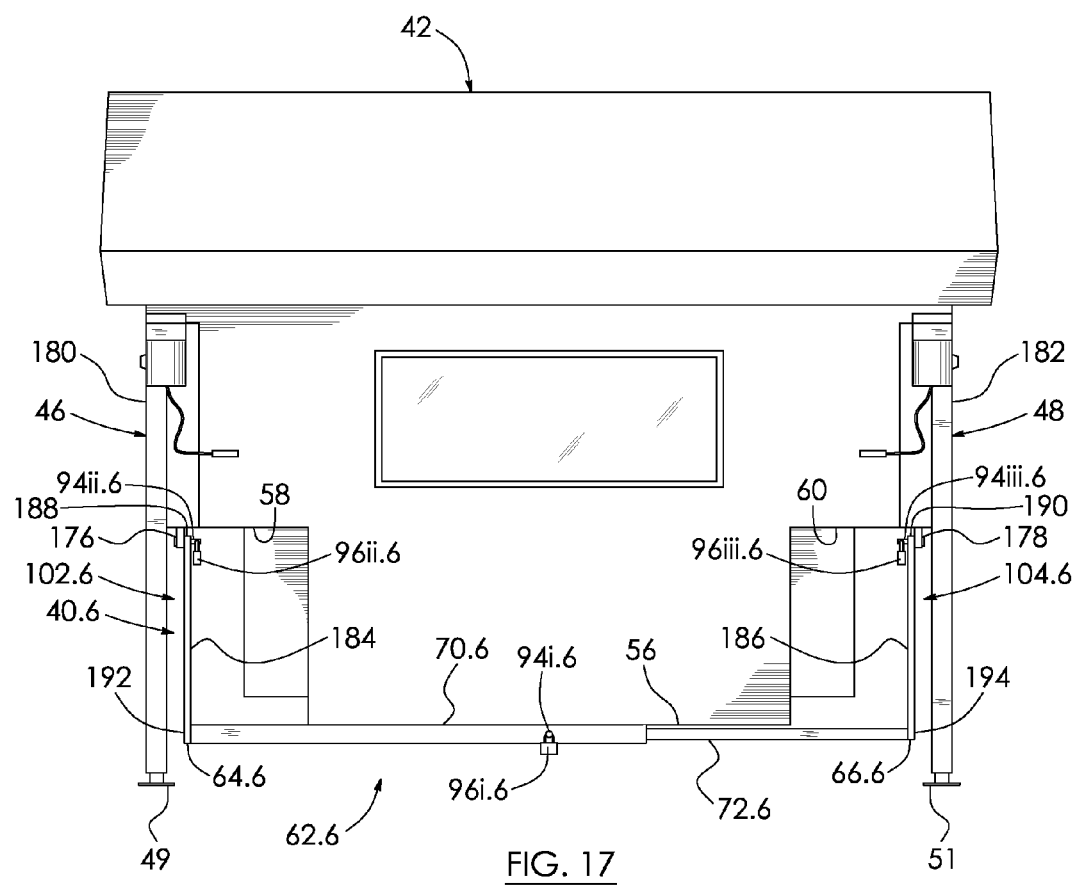
FIG. 17 is a front elevation view of the camper shown in FIG. 1 together with an anti-theft system for the camper according to a seventh embodiment, the system including mounts that connect to and extend down from tie downs of the camper and a barrier extending therebetween.

FIG. 17 shows an anti-theft system 40.6 for the camper 42 according to a seventh embodiment. Like parts of system 40.6 have like numbers and function as system 40 shown in FIGS. 1 to 7 with the addition of "0.6". Camper 42 includes conventional tie downs 176 and 178 located adjacent to the camper's sides 180 and 182. The tie downs are disposed adjacent to jacks 46 and 48 and extend from the camper's recessed portions 58 and 60.

System 40.6 includes a barrier 62.6 that has telescoping bars 70.6 and 72.6 and mounts 102.6 and 104.6 in the form of connecting bars 184 and 186. Bars 184 and 186 have first ends 188 and 190 that connect to the tie downs 176 and 178 via pins 94ii.6 and 94iii.6 and locks 96ii.6 and 96iii.6. Bars 184 and 186 have second ends 192 and 194 opposite their first ends. The bars extend downwards from the tie downs and below bottom 56 of the camper, in this example. Ends 64.6 and 66.6 of bars 70.6 and 72.6 fixedly connect to ends 192 and 194 of bars 184 and 186 for example by welding. Thus, in this embodiment, barrier 62.6 only operatively connects to jacks 46 and 48 and does not directly connect to the jacks. Rather, barrier 62.6 is configured to connect to and extend downwards from tie downs 176 and 178.

Figure 18:
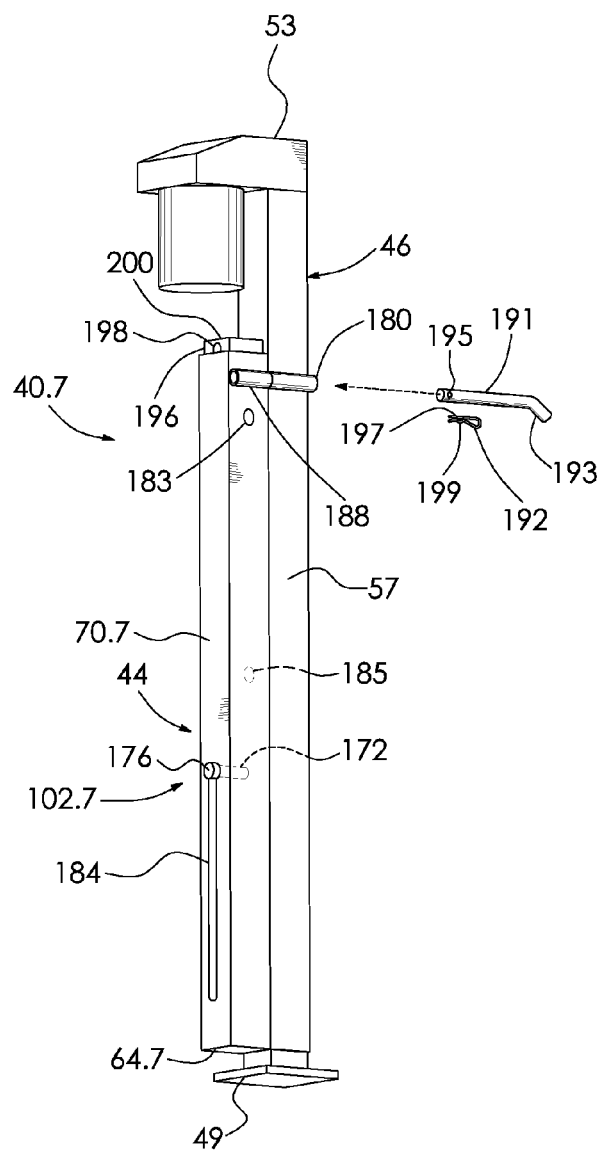
FIG. 18 is a perspective view of one of the camper jacks shown in FIG. 1 and part of anti-theft system for a camper according to an eighth embodiment, the system including a bar pivotally mounted to the jack and a pin and clip, the system being shown in a storage position.
Figure 19:
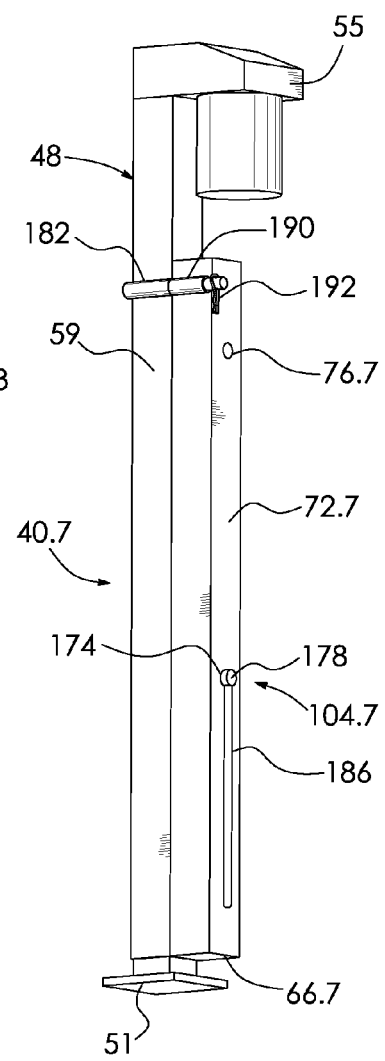
FIG. 19 is a perspective view of a further one of the camper jacks shown in FIG. 1 and a further part of the anti-theft system according to the eighth embodiment, the system including another bar pivotally mounted to the further jack, the system being shown in a storage position.
Figure 20:
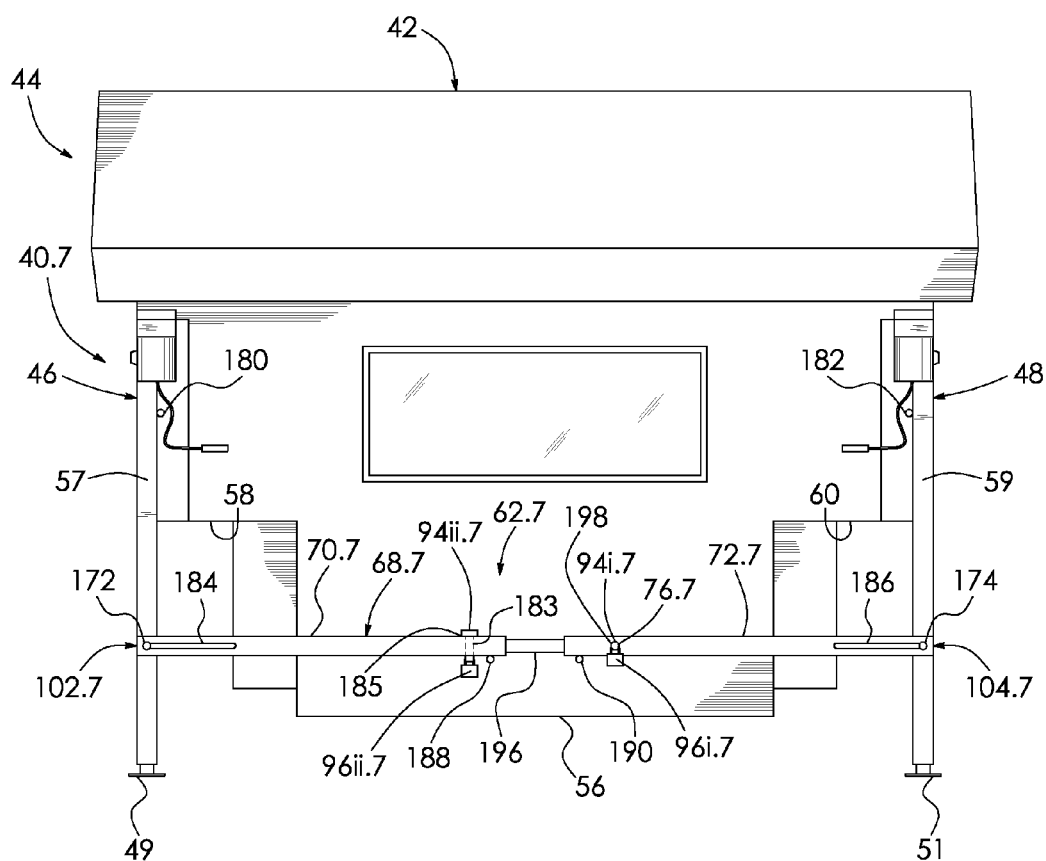
FIG. 20 is a front elevation view the camper shown in FIG. 1 and anti-theft system according to the eighth embodiment, the system being shown in a locking position.

FIGS. 18 to 20 show an anti-theft system 40.7 for the camper 42 according to an eighth embodiment. Like parts of system 40.7 have like numbers and function as system 40 shown in FIGS. 1 to 7 with the addition of "0.7". System 40.7 is similar to system 40 shown in FIGS. 1 to 7 with the following exceptions. Mounts 102.7 and 104.7 have lower connector portions, in this example, pins 172 and 174. Pins 172 and 174 connect to leg members 57 and 59 in this example via welding. Pins 172 and 174 are spaced-apart from and adjacent to ends 49 and 51 of the jacks and are configured to extend in the direction of the front end 44 of the camper. Knobs 176 and 178 are connectable via welding to the distal ends of the pins 172 and 174. Mounts 102.7 and 104.7 also have upper connector portions, in this example, tubes 180 and 182. Tubes 180 and 182 are disposed spaced-apart from and adjacent to upper ends 53 and 55 of the jacks.

FIGS. 18 and 19 show bars 70.7 and 72.7 in storage positions in which the bars extend along and in parallel with their respective jacks in a vertical direction. Bars 70.7 and 72.7 have lower connector portions, in this example, elongate slots 184 and 186. The slots extend in an upwards direction from ends 64.7 and 66.7 of the bars from the perspective of and in the position of the bars shown in FIGS. 18 and 19. Slots 184 and 186 are configured to enable pins 172 and 174 to extend therethrough and slidably therealong. Knobs 176 and 178 may be connected, via welding for example, to the ends of the pins to hold the bars in place. The bars 70.7 and 72.7 so configured are pivotally mounted to the pins 172 and 174 and held in place between the jacks and knobs. Put another way, bars 70.7 and 72.7 so configured are thus pivotally mounted to the mounts 102.7 and 104.7 for pivoting about pins 172 and 174

Bars 70.7 and 72.7 have upper connector portions, in this example tubes 188 and 190. The tubes are configured to align with tubes 180 and 182 of the jacks when the bars 70.7 and 72.7 are disposed in the storage positions shown in FIGS. 18 and 19.

As shown in FIG. 18, system 40.7 includes conventional pins 191 and clips 192 in this example. Pin 191 has a bent portion 193 at its first end and a transversely extending aperture 195 extending therethrough adjacent to the pin's second end. Clip 192 has an elongate portion 197 shaped to fit within and partially extend through aperture 195 of the pin 191. Clip 192 also has a corrugated portion 199 connected to and adjacent to the elongate portion 197. Corrugated portion 199 is configured to hold clip 192 in place upon the clip being inserted within aperture 195. Pins 191 are shaped to selectively extend through tubes 188 and 180 and 190 and 182, respectively. Thereafter, elongate portions 197 of the clips 192 may be inserted through apertures 195 for holding bars 70.7 and 72.7 in the vertically disposed, storage positions shown in FIGS. 18 and 19.

Bar 70.7 includes a further aperture 183 disposed adjacent to tube 188. Aperture 183 extends through bar 70.7.

The system 40.7 includes a further, telescopically retractable and extendable bar 196 which is selectively disposable within bar 70.7 in this example and which is shown in its retracted position in FIG. 18. Bar 196 is similar in length to bar 70.7 and also includes an elongate, open ended slot (not shown) shaped to enable pin 172 to pass therethrough and slidably therealong. Bar 196 has an aperture 198 at its distal end 200.

FIG. 20 shows system 40.7 in a locking position. Referring to FIGS. 18 to 20, when pins 191 are removed from the tubes 180, 182, 188 and 190, bars 70.7 and 72.7 may be pivoted downwards to right angled positions relative to jacks 46 and 48. Bars 70.7 and 72.7 may also be moved towards each other, with the bars sliding along pins 172 and 174 via slots 184 and 186. Bar 196 is extendable towards bar 72.7 until its end 200 is disposed within bar 72.7. Aperture 198 of bar 196 and aperture 76.7 of bar 72.7 may then be caused to align and lock together via pin 94i.7 and lock 96i.7 for locking the system 40.7 together in the locking position.

Bars 70.7, 196 and 72.7 so configured thus extend between the jacks 46 and 48 in the horizontal direction 68.7 so as to prevent an unauthorized vehicle from passing underneath the camper 42 and prevent mounting of the camper onto an unauthorized vehicle.

Bar 196 includes a further aperture 185 configured to align with aperture 183 of bar 70.7 when the system 40.7 is in the locking position shown in FIG. 20. Pin 94ii.7 extends vertically through apertures 183 and 185 of bars 70.7 and 196 and is locked in place with a padlock 96ii.7. Pin 94ii.7 and lock 96ii.7 so configured retain bars 196 and 70.7 together and prevent the bars from sliding apart.

FIGS. 21 to 23 show an anti-theft system 40.8 for camper jack 48 according to a ninth embodiment. Like parts of system 40.8 have like parts and numbers of system 40 shown in FIGS. 1 to 7 with the addition of "0.8". System 40.8 includes a locking device 202 for inhibiting operation of the jack.

The locking device has an engagement member 204 with a mating portion 128.8 shown in FIG. 22 configured to snugly engage the socket member 65 of the jack seen in FIG. 3. In this example, engagement member 204 includes a housing 206 that partially surrounds mating portion 128.8. The engagement member also in this example includes a shaft 208 connected to mating portion 128.8. The shaft extends outwards from housing 206. Shaft 208 has an aperture 210 at its distal end 211.

The locking device 202 includes a support member 212. The support member in this example includes a wall 214 configured to abut with and at least partially extend along side 81 of the jack, shown in FIG. 21, which is located opposite to side 77 on which the socket member 65 is disposed. Referring back to FIG. 22, support member 212 has a tube member 216 with a first end 218 facing the shaft 208, a second end 220 opposite thereof, and a centrally disposed aperture 222 extending therethrough. The tube member 216 and aperture 222 are configured to receive the shaft 208, as seen in FIG. 23. The tube member includes a transversely extending aperture 224 adjacent to its second end 220. Shaft 208 is configured such that when it is received within tube 216, apertures 210 and 224 are aligned.

The support member 212 is configured to abut with and at least partially extend along side 81 of the jack when the engagement member and the support member are so connected together. FIG. 23 shows device 202 in the locked position, with housing 206 and wall 214 being spaced-apart and extending parallel to each other. Engagement member 204 and support member 212 form an opening 226 shaped to receive sides 77 and 81 of the jack as seen in FIG. 21. Tube 216 is disposed below motor 61 when the device is in its locked position, though this is not strictly required. For example, in another embodiment, tube 216 may be disposed between motor 61 and jack 48.

As seen in FIG. 23, system 40.8 includes a lock mechanism 221, in this example in the form of conventional padlock 96.8 configured with its shackle 97.8 to pass through the apertures 210 and 224 and lock the device 202 in place. Padlock 96.8 is thus configured to selectively retain shaft 208 of the engagement member within aperture 222 of the support member. As shown in FIG. 21, the device 202 so configured and locked in place inhibits rotation of the socket member of the jack and thus inhibits operation of the jack.

Those skilled in the art will appreciate that many variations are possible within the scope of the invention shown in FIGS. 21 to 23. For example, tube 216 is not strictly required. In an alternative embodiment, support member 212 may simply include an aperture through which the shaft 208 passes. Also, in the embodiment shown in FIGS. 21 to 23, shaft 208 connects to and extends from engagement member 204. In the alternative, the shaft may connect to and extend from the support member 212 and the engagement member 204 would have an aperture for receiving the shaft.

If the jack had an inwardly-set socket member similar to mating portion 128.8, the engagement member would have an outwardly-extending mating portion configured similar to socket member 65 shown in FIG. 3.

FIGS. 24 to 27 show an anti-theft system 40.9 for camper jack 48 according to a tenth embodiment. Like parts of system 40.9 have like function and numbers as system 40.8 shown in FIGS. 21 to 23 with "0.9" replacing "0.8" and "0.9" being added to parts previously not having any decimal extensions. System 40.9 is similar to system 40.8 shown in FIGS. 21 to 23 with the following exceptions. As seen in FIG. 25, the locking device 202.9 includes an engagement member 204.9 that is in the form of a j-shaped bar that is hexagonal-shaped in cross-section in this example. Thus, mating portion 128.9 and shaft 208.9 are integral in this example. Shaft 208.9 includes a plurality of grooves 226 adjacent to its distal end 211.9.

The locking device 202.9 includes a support member 212.9 having a housing 228 through which aperture 222.9 extends. Referring to FIG. 26, housing 228 has a space 230. Locking mechanism 221.9 in this example is partially disposed within space 230 of the housing 228. The locking mechanism includes a protrusion, in this example a latch 232 disposed within space 230. The latch has a first end 234, a second end 236 opposite thereof and a notch 238 disposed between ends 234 and 236. The locking mechanism includes a spring 240 disposed within space 230. End 234 abuts spring 240 and end 236 is disposed adjacent to aperture 222.9. The spring is configured to bias latch 232 downwards from the perspective of FIG. 26, from an unlocked position shown in FIG. 26, to a locked position shown in FIG. 27. Locking mechanism 221.9 includes a key 242 the rotation of which causes a rotatable projection 244 extending within notch 238 to rotate. Projection 244 is rectangular in cross-section in this example with a wider side 246 shown in FIG. 26 and a thinner side 248, perpendicular to side 246, shown in FIG. 27. The thinner side 248 is smaller than the wider side 246.

In the unlocked position shown in FIG. 26, thinner side 248 of projection 244 abuts against latch 232 via notch 238. Projection 244 so positioned lifts up the latch, with the latch's end 236 remaining clear of aperture 222.9. To lock the device 202.9, rotation of key 242 causes projection 244 to rotate such that its thicker side 246 abuts notch 238, as seen in FIG. 27. This allows spring 240 to actuate latch 232 downwards such that end 236 of the latch lockably engages with one of the grooves 226 of shaft 208.9 shown in FIG. 25. Thus, mating portion 128.9 of engagement member 204.9 connects to the socket member 65 of the jack, with the support member 212.9 then connecting to engagement member 204.9 such that wall 214.9 abuts side 81 of the jack, upon which the device may be locked in place via key 242.

FIGS. 29 to 31 show an anti-theft system 40.10 according to an eleventh embodiment for a camper using a hydraulic jack 250 as shown in FIGS. 28 and 29. Like parts of system 40.10 have like function and numbers as system 40.8 shown in FIGS. 21 to 23 with "0.10" replacing "0.8" and "0.10" being added to parts previously not having any decimal extensions. System 40.10 is similar to system 40.8 shown in FIGS. 21 to 23 with the following exceptions.

Referring to FIG. 28, jack 250 has a rounded leg member 251 with a pair of spaced-apart sides 252 and 254 and a hydraulic lever 256 adjacent to side 252. Lever 256 includes a tube 258 through which shaft 260 of a removable handle 262 extends. Lever 256 is operatively linked to an actuator 257 and hydraulic reservoir 259. Manual up and down motion of handle 262 when inserted within tube 258 causes lever 256 to engage actuator 257 which in turn raises the jack via hydraulic pressure. Jack 250 also includes a release valve 264 for manually lowering the jack. The valve 264 is located adjacent to side 254 in this example. The hydraulic jack is conventional, with its parts and operation being well known to those skilled in the art. Jack 250 per se will therefore not be described in further detail.

Referring to FIG. 30, the locking device 202.10 includes an engagement member 204.10 that is j-shaped. The engagement member has a lever connector 266 configured to engage the hydraulic lever of the jack. Connector 266 is hook-shaped in this example and is configured via its end 268 to at least partially extend through tube 258 shown in FIGS. 28 and 29.

The locking device 202.10 includes a support member 212.10 in the form of a u-shaped tube 270 in this example. Tube 270 is configured to partially extend around leg member 251 of the jack as shown in FIG. 29. Tube 270 has a first portion 272 through which aperture 224.10 extends. First portion 272 is shaped to partially receive end 211.10 of the lever connector 266. Aperture 224.10 is alignable with aperture 210.10 and through which shackle 97.10 of lock 96.10 extends for the locking the system 40.10 in place, as seen in FIG. 29. Support member 212.10 so configured abuts side 254 and actuator 257 in this example, thereby inhibiting a user from removing the device 202.10 by lifting it upwards from the perspective of FIG. 29. Connector 266 inhibits operation of lever 256, thus inhibiting operation of jack 250. Support member 212.10 so configured also inhibits removal of connector 266 when the device is locked in place.

Referring back to FIG. 30, tube 270 also includes a second portion 274 opposite the first portion 272 in this example. Tube 270 further includes a cap 276. The cap is in the shape of an open-ended cylinder in this example as shown in FIG. 31, with the cap having an opening 278. Cap 276 is part of support member 212.10 and is disposed between portions 272 and 274. The cap is configured to cover the release valve 264, as shown with reference to FIGS. 28 and 29. Cap 276 is thus configured to inhibit access to the valve when device 202.10 is locked in place and prevents the camper from being lowered.

FIGS. 32 to 35 show an anti-theft system 40.11 according to a twelfth embodiment for a camper using the hydraulic jack 250. Like parts of system 40.11 have like function and numbers as system 40.10 shown in FIGS. 28 to 31 with "0.11" replacing "0.10" and "0.11" being added to parts previously not having any decimal extensions. System 40.11 is similar to system 40.10 shown in FIGS. 28 to 31 with the following exceptions.

Locking device 202.11 as shown in FIG. 35 is similar to device 202.10 shown in FIGS. 29 to 31 with the exception that support member 212.11 is part of a mount 280, as shown in FIGS. 33 and 34, and the engagement member 204.11 is j-shaped and consists of lever connector 266.11.

As mentioned above, system 40.11 further includes mount 280. As best shown in FIG. 33, the mount has brackets 282 with apertures 283 extending therethrough. Brackets 282 are disposed adjacent to lower end 284 of the mount. The brackets are similar to brackets 118 and 120 shown for system 40 in FIG. 2 and through which pin 94$i$.11 and lock 96$i$.11 and barrier 62.11 may connect, as have been previously described. Barrier 62.11 is shown fragmented in this example; however, pin 94$i$.11, lock 96$i$.11 and barrier 62.11 are substantially the same as those shown in FIGS. 1 and 5 to 7, with like function and numbers and the addition of "0.11".

As shown in FIG. 32, mount 280 substantially extends along the length of the jack 250. Upper end 286 of the mount 280 is spaced-apart opposite lower end 284 thereof. The mount includes a flange 288 adjacent to end 286 and which extends from side 254 of the jack. As best shown in FIGS. 33 and 34, mount 280 includes a cap 289 connected to upper end 286 via flange 288. The cap is cylindrical, in this example, and is configured to cover the release valve 264, shown in FIG. 28, of the jack, for inhibiting access to the release valve thereby.

The mount includes an aperture 290 adjacent to end 286. The aperture extends through the mount and flange 288. Aperture 290 is configured such that shaft 208.11 of the lever connector 266.11 is extendable through aperture 290 as shown in FIG. 32.

Thus, the locking of lever connector 266.11 with padlock 96$ii$.11 also causes mount 280 to be locked in place. Mount 280 so configured thus inhibits raising or lowering of the jack.

FIGS. 36 to 41 show an anti-theft system 40.12 according to a thirteenth embodiment for a camper jack 292. The jack has a housing 293 with a socket member 294 disposed on the top 296 of the housing, as best shown in FIG. 37. Socket member 294 operatively connects to a thread screw mechanism and rotation of the socket member thus causes the jack to raise or lower. The socket member includes a square socket 297 in this example. Referring back to FIG. 36, housing 293 has a lower end rim portion 298, to which motor 300 and leg member 302 connect.

Like parts of system 40.12 have like function and numbers as system 40.10 shown in FIGS. 28 to 31 with "0.12" replacing "0.10" and "0.12" being added to parts previously not having any decimal extensions. System 40.12 is similar to system 40.10 shown in FIGS. 28 to 31 with the following exceptions. Referring to FIGS. 39 and 40, locking device 202.12 includes an engagement member 204.12 in the form of a u-shaped bar 304. The bar has lower ends 306 and 308 with apertures 310 and 312 adjacent thereto. Bar 304 includes an upper end 314 spaced-apart from and interposed between ends 306 and 308. The bar includes a mating portion 128.12 in the form of a protrusion 131.12, in this example. Protrusion 131.12 extends downwards from the upper end 314 and towards the lower ends 306 and 308. The protrusion is square-shaped in cross-section. Protrusion 131.12 is configured to snugly fit with and engage the square socket 297 of socket member 294 as best shown in FIG. 37.

As shown in FIG. 38, locking device 202.12 includes a support member 212.12 that has a generally oval-shaped exterior in this example and which comprises a pair of u-shaped tubes 316 and 318 in this example. Tube 316 has ends 320 and 322 with apertures 324 and 326 adjacent thereto. Tube 318 has ends 328 and 330 with apertures 332 and 334 adjacent thereto. Referring to FIGS. 36 and 38, tube 316 is shaped to receive tube 318 via ends 320 and 322 such that support member 212.12 snugly extends around the jack with the support member 212.12 abutting rim portion 298 and the aperture 324 aligns with 332 and 326 aligns with 334. The support member so shaped and positioned abuts rim portion 298 and thus inhibits a user from lifting the support member upwards, from the perspective of FIG. 36. Apertures 324, 326, 332, 334 are shaped to receive therethrough the ends 306 and 308 of the engagement member 204.12, as shown in FIGS. 36 and 39. The system 40.12 includes a lock mechanism 221.12, in this example in the form of a pair of padlocks 96.12, only one of which is shown in FIG. 36, in this example, with shackles 97.12 inserted through apertures 310 and 312 of the engagement member 204.12 for locking the system 40.12 in place. Those skilled in the art will appreciate however that only one padlock is required to lock system 40.12 in place by passing through only one of the apertures 310 and 312 of the engagement member 204.12.

It will be appreciated that many variations are possible within the scope of the invention described herein. For example, the present invention describes the system connecting to at least a pair of jacks. As a further variation, the system may be configured to only connect to and inhibit operation of one, three or more jacks.

Also, the system as herein described is configured to connect to jacks. In the alternative, the system may connect to struts, legs or other support members that function to retain the camper in an elevated and/or supported position.

In a further variation to system 40.7, bar 196 shown in FIGS. 18 and 20 need not be similar in length to bar 70.7 but rather may be shorter than bar 70.7.

Often, trucks and campers are stolen together as a unit when the camper is mounted on the truck. Various embodiments as herein described may be used to inhibit such theft by enabling the owner to lower the camper's jacks and then lock the jacks in place with one of the embodiments as herein described when the unit is parked. For example, mounts 102 and 104 may be used to this effect, as may be the assemblies 40.8, 40.9, 40.10, and 40.12. The jacks so lowered and locked in place inhibit the operation of the truck and thus inhibit theft of the truck camper unit. Also, dragging of the lowered jacks on the road may cause noise and attract unwanted attention to a thief, thus further acting to inhibit theft of trucks with campers mounted thereon.

It will be understood by someone skilled in the art that many of the details provided above are by way of example only and are not intended to limit the scope of the invention which is to be determined with reference to the following claims.

What is claimed is:

1. An anti-theft system for a camper, the camper being supported at its front end by a pair of spaced-apart jacks, the system comprising:
a barrier having a first end operatively connecting to a first one of the jacks, a second end opposite thereof, the second end of the barrier operatively connecting to a second one of the jacks, and a pair of outer apertures adjacent to its ends, the barrier being length adjustable and extending in a horizontal direction, and the barrier being positioned and configured to prevent an unauthorized vehicle from passing underneath the camper and mounting of the camper onto the vehicle;

a pair of mounts for mounting the barrier in the horizontal direction, the mounts each having at least one aperture, the ends of the barrier connecting to the mounts and the mounts being fixedly connected to the jacks; and a pair of locks configured to operatively connect the barrier to the mounts via the apertures of the barrier and the apertures of the mounts for lockably securing the barrier to the mounts.

2. The system as claimed in claim 1 wherein the barrier includes a first bar connecting to a first one of the mounts and a second bar connecting to a second one of the mounts, and wherein the system further includes a means for lockably securing the system in place, said means including fixedly connecting the bars together.

3. The system as claimed in claim 2 wherein the barrier is telescoping, with the first bar being hollow and the second bar partially receivable within the first bar.

4. The system as claimed in claim 1, the camper having a bottom and wherein the barrier includes a horizontal portion extending between the jacks and the barrier includes a vertical portion disposed between the first end and the second end of the barrier, the vertical portion of the barrier extending downwards relative to the horizontal portion and extending downwards below the bottom of the camper, the vertical portion being thus configured to further prevent the unauthorized vehicle from passing underneath the camper.

5. The system as claimed in claim 1 wherein the mounts include u-shaped brackets, the brackets being outwardly facing relative to the barrier, the brackets being configured to receive and abut with respective ones of the jacks.

6. The system as claimed in claim 1, the jacks having lower ends, the camper having a pair of recessed portions for receiving sides of a truck, the camper having jack mounts adjacent to the recessed portions and upon which the jacks connect and wherein the system further comprises a pair of elongated, u-shaped brackets configured to receive and abut with respective ones of the jacks, the brackets being configured to extend between the lower ends of the jacks and the recessed portions of the camper, the brackets also being configured to abut the jack mounts when the brackets are lifted upwards, thus acting to inhibit upward movement of the barrier and further secure the system in place.

7. The system as claimed in claim 1 further including a pair of u-shaped brackets configured to receive and abut with respective ones of the jacks, the brackets having lower ends and upper ends opposite thereof, the barrier including a first bar that connects to the lower end of a first one of the brackets and an upper end of a second one of the brackets, and the barrier including a second bar that connects to the upper end of the first one of the brackets and the lower end of the second one of the brackets.

8. The system as claimed in claim 1, wherein the barrier includes a first bar connectable to a first one of the mounts and a second bar connectable to a second one of the mounts, the bars having inner apertures that are alignable with each other upon the bars being connected to the mounts and wherein the system includes a further lock configured to operatively connect the bars together via the inner apertures of the bars.

9. The system as claimed in claim 1 wherein the barrier is a flexible member with looped-ends, the apertures of the barrier being formed by the looped-ends thereby.

10. The system as claimed in claim 1, wherein the mounts are configured to substantially extend along and in parallel with the jacks in a vertical direction and wherein the mounts are configured to connect to and mount the barrier in the horizontal direction.

11. The system as claimed in claim 2, wherein the first bar is pivotally mounted to the first one of the mounts, the second bar is pivotally mounted to the second one of the mounts, and the bars are configured to be disposable in storage positions in which the bars extend along and in parallel with their respective jacks in a vertical direction and the bars are configured to be disposable in locking positions in which the bars extend between the jacks in the horizontal direction so as to prevent the unauthorized vehicle from passing underneath the camper and prevent mounting of the camper onto the vehicle.

12. The system as claimed in claim 1, the camper having a pair of tie downs disposed adjacent to the jacks and wherein the barrier is configured to connect to and partially extend downwards from the tie downs.

13. The system as claimed in claim 1, the camper having a bottom, a pair of recessed portions for receiving sides of a truck, and jack mounts adjacent to the recessed portions and upon which the jacks connect, the jacks having lower ends and the system further comprising:

a pair of u-shaped brackets configured to receive and abut with respective ones of the jacks, the brackets being configured to extend between the lower ends of the jacks and the recessed portions of the camper, the brackets also being configured to abut the jack mounts when the brackets are lifted upwards, inhibiting upward movement of the brackets thereby;

the barrier having a horizontal portion in the form of a first bar connecting to a first one of the brackets and a second bar connecting to a second one of the brackets, the first bar being hollow and the second bar partially receivable within the first bar, and the barrier having a vertical portion adjacent to the first bar and the second bar, the vertical portion of the barrier extending downwards relative to the bars and extending downwards below the bottom of the camper, the barrier being thus configured to further prevent the unauthorized vehicle from passing underneath the camper and mounting of the camper onto the vehicle; and means for lockably securing the system in place, said means including fixedly connecting the bars together and fixedly connecting the bars to the brackets.

14. A locking device for inhibiting operation of a camper jack, the jack having a pair of spaced-apart sides and a socket member located adjacent to a first one of said sides, the socket member operatively connecting to a thread screw mechanism for raising and lowering the jack upon rotation of the socket member, and the device comprising:

an engagement member having a mating portion configured to snugly engage the socket member of the jack;

a support member, a first one of the engagement member and the support member having a shaft and a second one of the engagement member and the support member having an aperture configured to receive the shaft, the support member being configured to abut with and at least partially extend along at least one of the sides of the jack when both the mating portion and the socket member are engaged and the engagement member and the support member are so connected together; and a locking mechanism configured to selectively retain the shaft of the first one of the engagement member and the support member within the aperture of the second one of the engagement member and the support member, the device inhibiting rotation of the socket member and thus inhibiting operation of the jack thereby.

15. The locking device as claimed in claim 14, the jack having a top and the socket member being located on the top of the jack, and wherein the engagement member at least partially extends over the top of the jack.

16. An anti-theft system for a camper having a hydraulic jack, the jack having a pair of spaced-apart sides and a hydraulic lever adjacent to a first one of said sides for manually operating the jack, the system having a locking device comprising:
- an engagement member having a lever connector configured to engage the hydraulic lever of the jack;
- a support member, a first one of the engagement member and the support member having a shaft and a second one of the engagement member and the support member having an aperture configured to receive the shaft, the support member being configured to abut with and at least partially extend along one of the sides of the jack when both the lever connector and the hydraulic lever are engaged and the engagement member and the support member are so connected together; and
- a locking mechanism configured to selectively retain the shaft of the first one of the engagement member and the support member within the aperture of the second one of the engagement member and the support member, the device inhibiting actuation of the lever and thus inhibiting operation of the jack thereby.

17. The system as claimed in claim 16, the jack further including a release valve for manually lowering the jack, and wherein the support member includes a cap configured to cover the release valve when both the lever connector and the hydraulic lever are engaged and the engagement member and the support member are connected together, the cap inhibiting access to the valve thereby.

18. An anti-theft system for a camper, the camper being supported at its front end by a pair of spaced-apart jacks, at least one of the jacks having an exposed socket member rotation of which raises and lowers the jacks, the system comprising:
- a barrier having a first end operatively connected to a first one of the jacks, and a second end opposite thereof, the second end of the barrier operatively connecting to a second one of the jacks, the barrier extending in a horizontal direction and being positioned and configured to prevent an unauthorized vehicle from passing underneath the camper and mounting of the camper onto the vehicle; and
- a pair of mounts configured to lockably connect to the jacks, at least one of the mounts having a mating portion configured to snugly engage said socket member of the at least one of the jacks so as to inhibit rotation of the socket member thereby and thus inhibit operation of the jack.

* * * * *